Feb. 27, 1968  A. L. OLER  3,370,719
AUTOMATIC BALE STOOKER
Filed Feb. 9, 1966  11 Sheets-Sheet 1

INVENTOR
ALLEN L. OLER
BY *Smart & Biggar*
ATTORNEYS.

Feb. 27, 1968   A. L. OLER   3,370,719
AUTOMATIC BALE STOOKER
Filed Feb. 9, 1966   11 Sheets-Sheet 2

INVENTOR
ALLEN L. OLER
BY Smart & Biggar
ATTORNEYS.

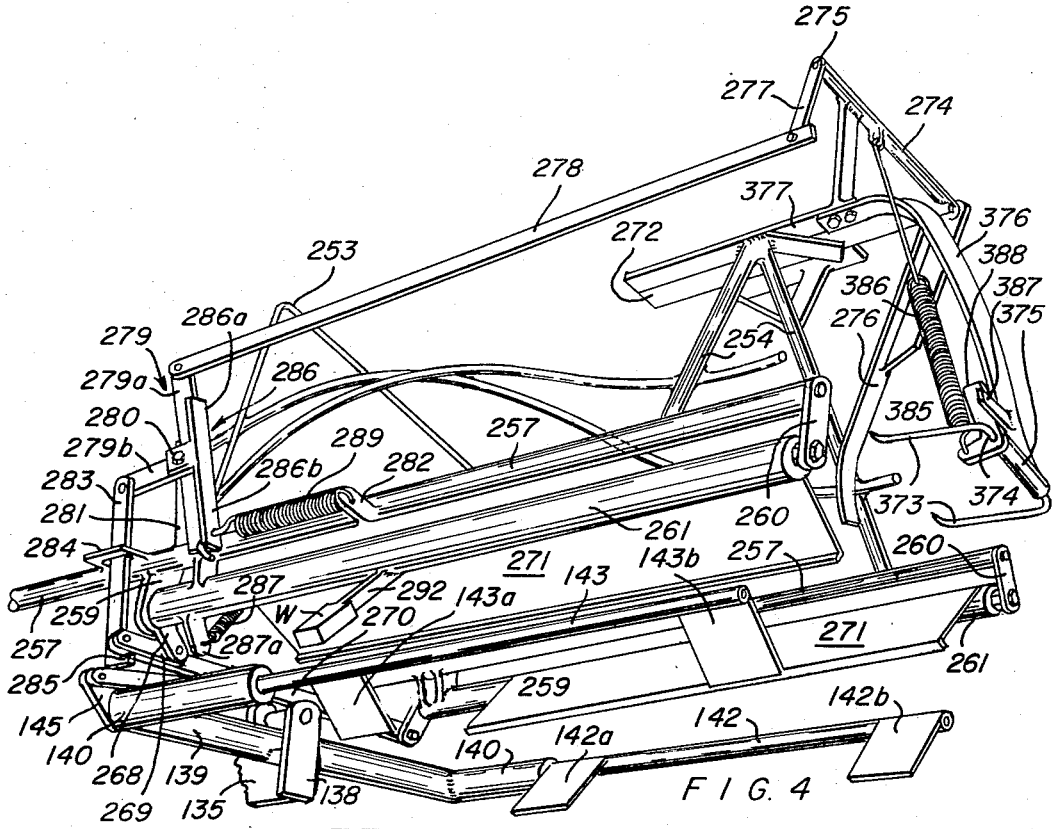
FIG. 4
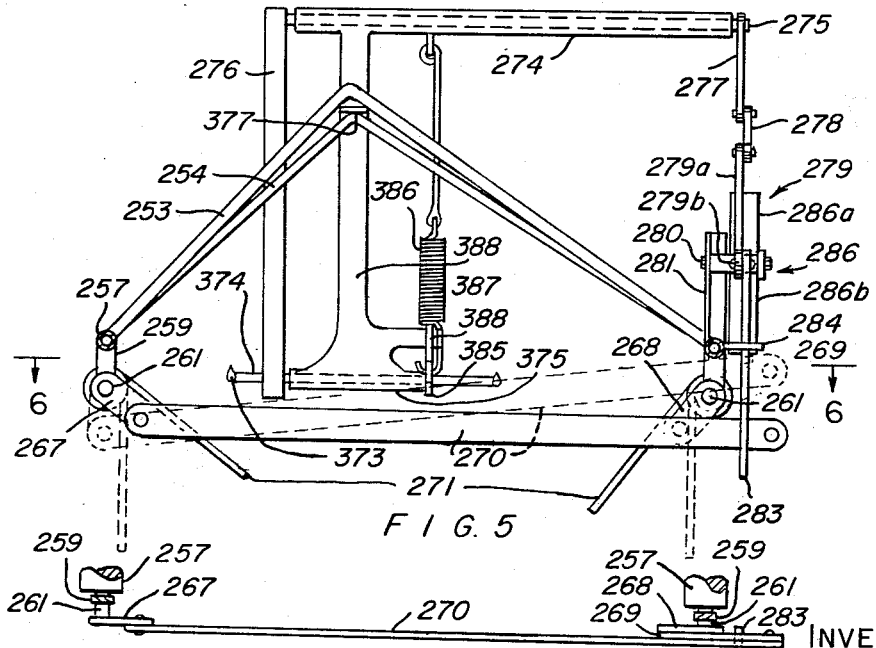
FIG. 5
FIG. 6
INVENTOR
ALLEN L. OLER
BY Smart & Biggar
ATTORNEYS.

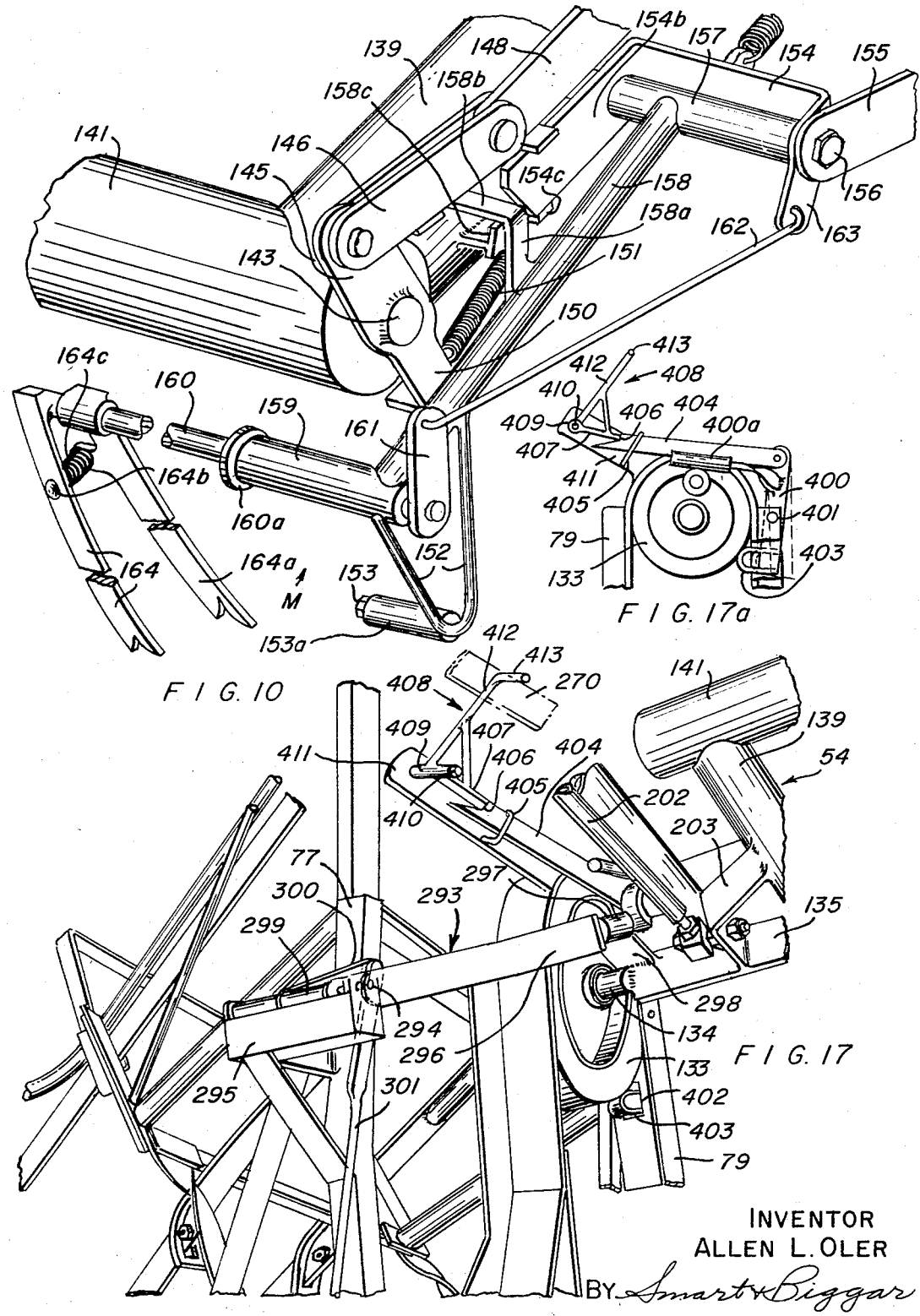

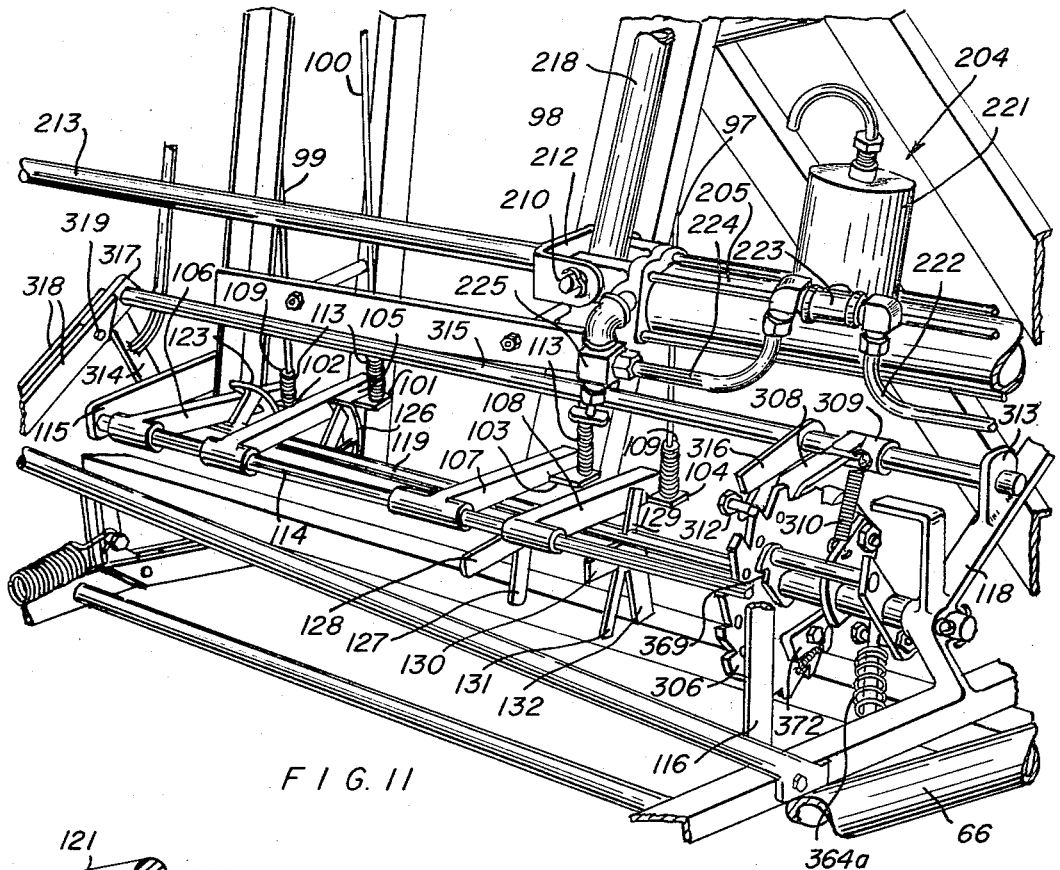
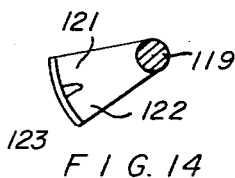
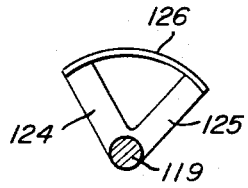
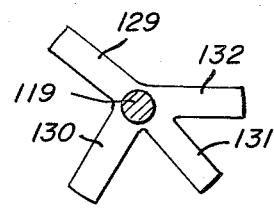
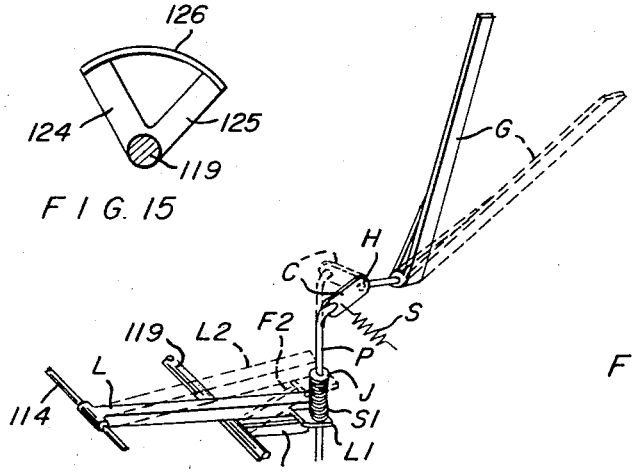

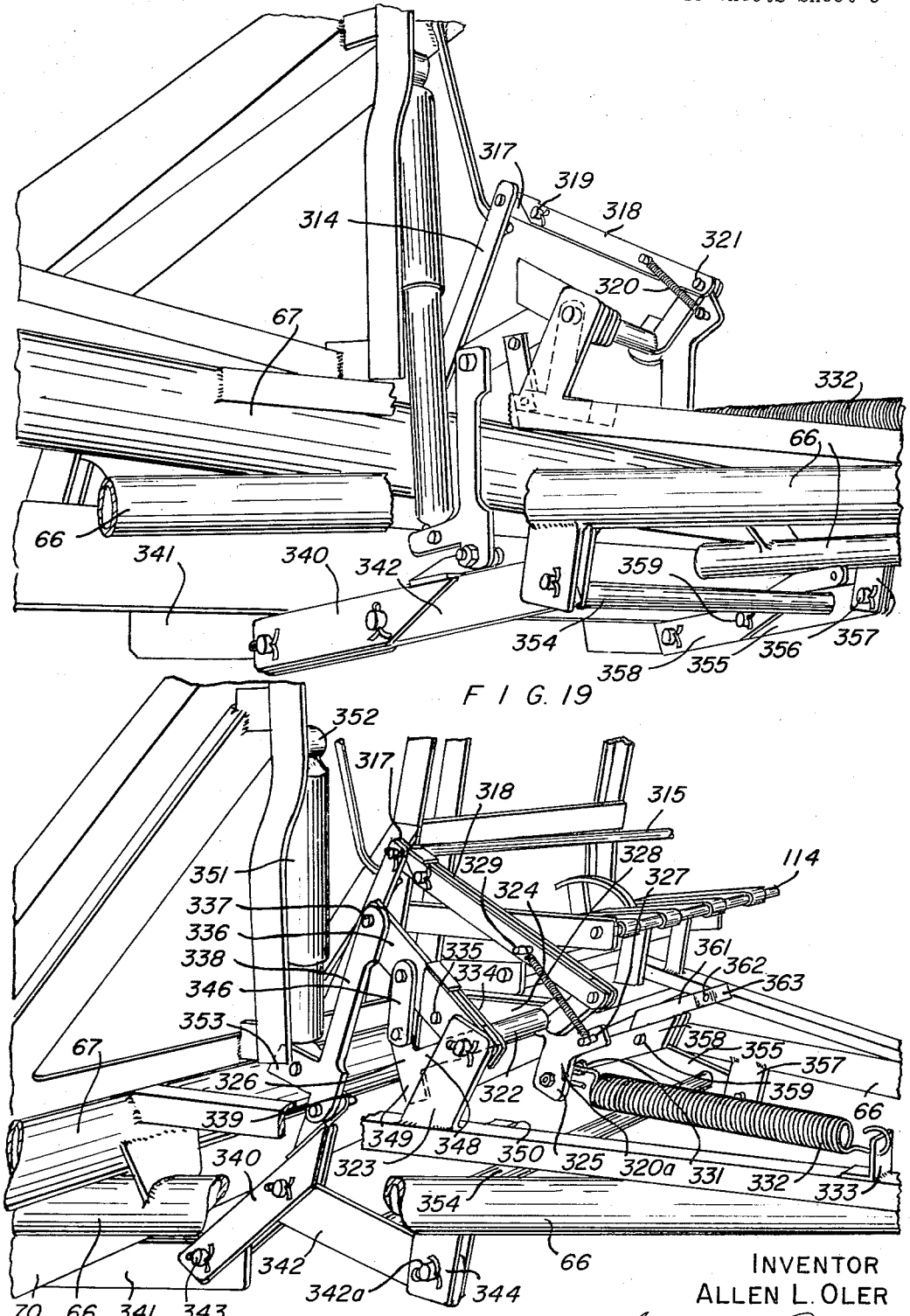

Feb. 27, 1968  A. L. OLER  3,370,719
AUTOMATIC BALE STOOKER
Filed Feb. 9, 1966  11 Sheets-Sheet 10
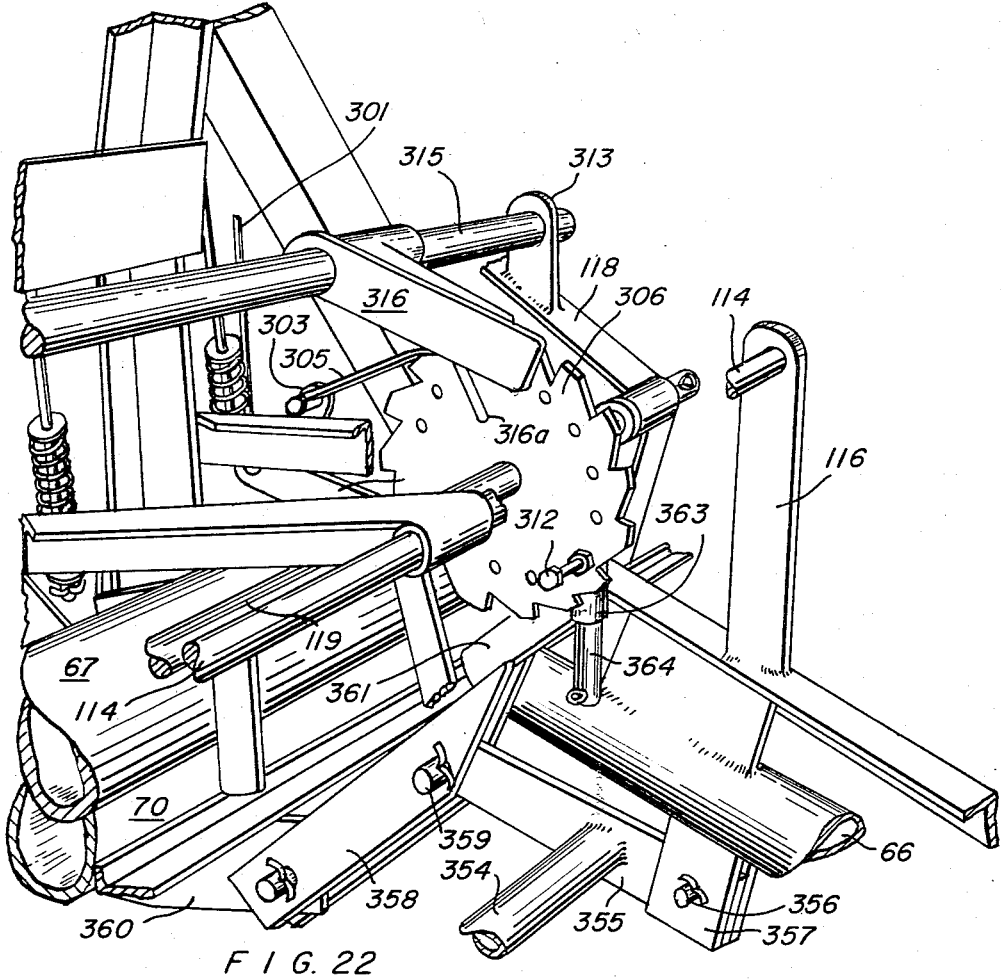
FIG. 22
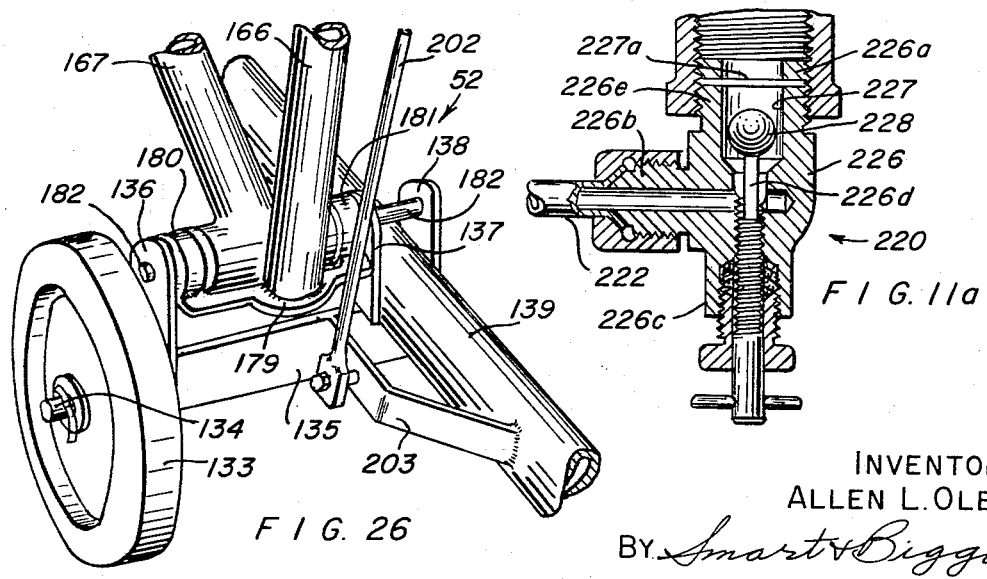
FIG. 26
FIG. 11a
INVENTOR
ALLEN L. OLER
BY Smart & Biggar
ATTORNEYS.

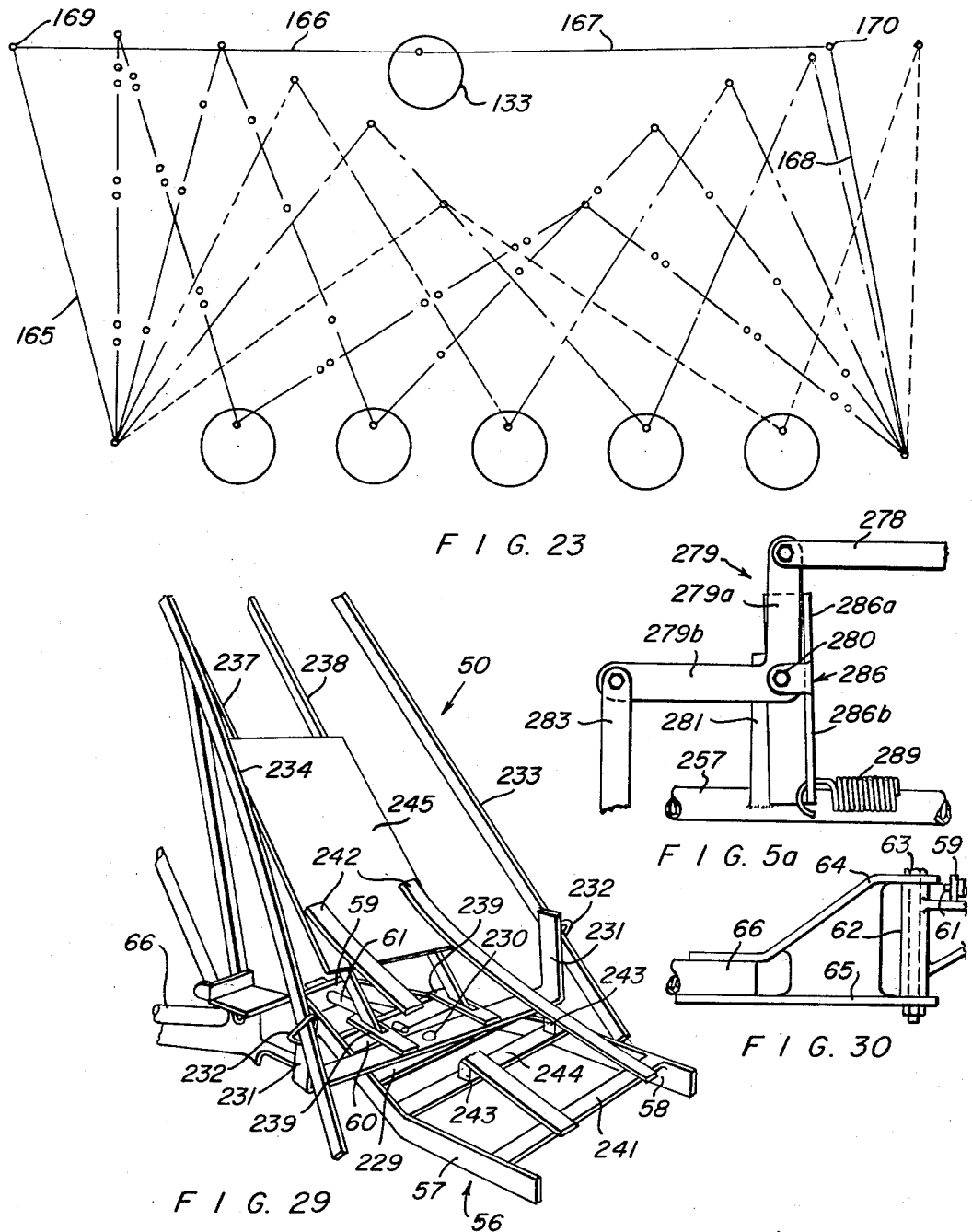

United States Patent Office 3,370,719
Patented Feb. 27, 1968

3,370,719
AUTOMATIC BALE STOOKER
Allen L. Oler, Rosemary, Alberta, Canada, assignor to Oler-Stringam Manufacturing Ltd., Alberta, Canada
Filed Feb. 9, 1966, Ser. No. 526,258
Claims priority, application Canada, Feb. 17, 1965, 923,550
7 Claims. (Cl. 214—6)

ABSTRACT OF THE DISCLOSURE

Automatic bale stooking apparatus for forming a pyramidal shaped stook. A chute guides the bales upward to a station where each bale is turned with one edge directed downwardly and deposited onto a carriage. The carriage is guided downwardly by a trackway, and a tripping mechanism causes each bale to be deposited into a preselected position in a stook being formed on a supporting fork. Upon completion of the stook, a further tripping mechanism causes the free end of the fork to drop thereby depositing the completed stook on the ground.

---

Figure 1:
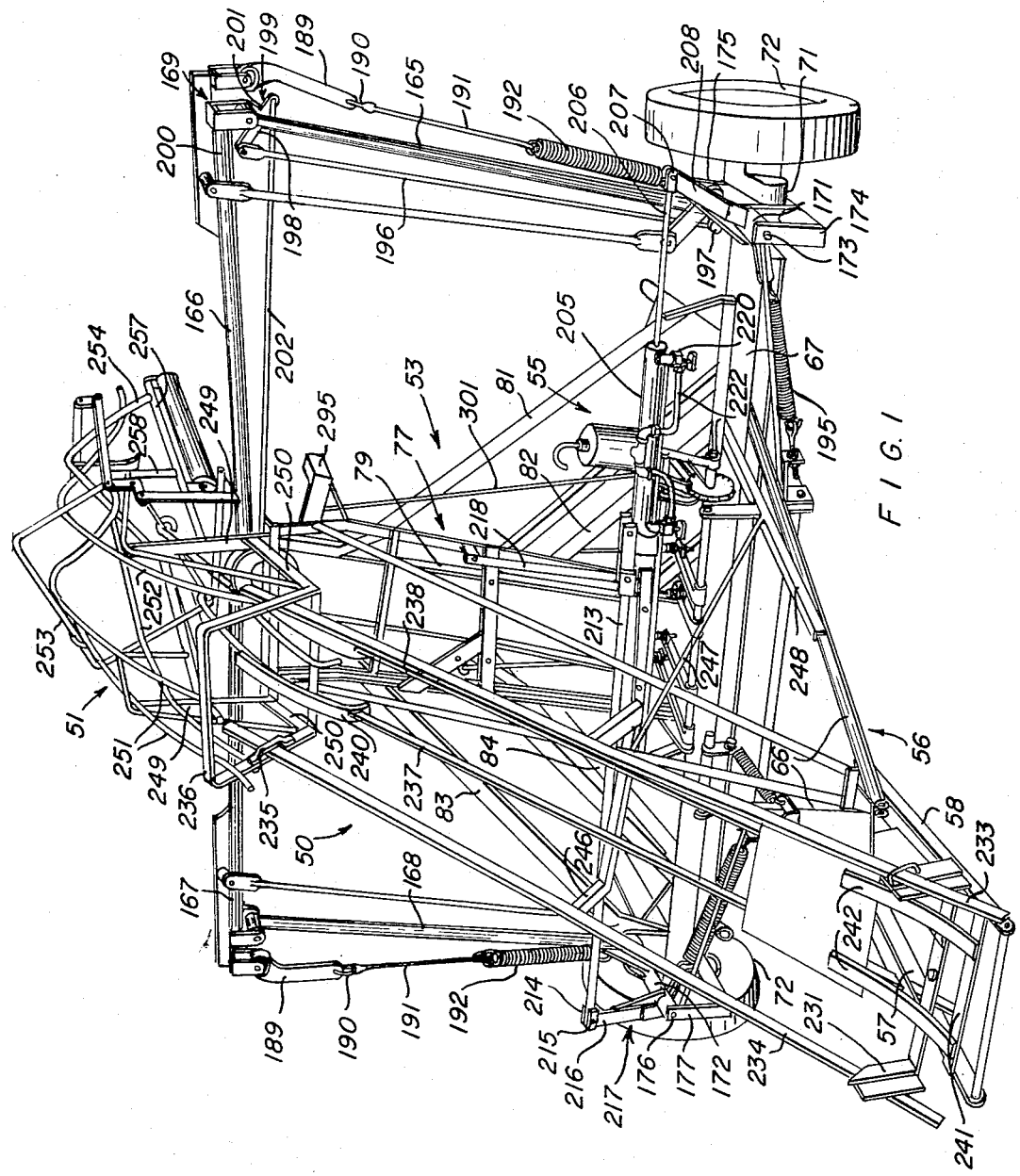

This invention relates to automatic bale stookers for hay or the like, and more particularly to an automatic bale stooker for stooking bales in a cottage type stook, that is, a stook of triangular cross section having smoothly sloping side walls terminating upwardly in a peak or ridge, and a substantially flat base.

After hay has been cut, it must be cured and this is usually accomplished by leaving the hay in windrows, or in tightly compressed bales to be exposed to the sun to effect the curing. In some cases the bales are collected and a relatively large number are deposited at one location on the field in a pile of rectangular cross section. This latter practice has the advantage of reducing the number of stops that must be made when the hay is picked up after curing. However, all of these practices leave the hay at the mercy of inclement weather, and, in the event of rain, the hay becomes thoroughly soaked and, if it is baled, the bales seat flat upon the damp ground. The result is a relatively high incidence of spoilage due to mildew or other forms of rot arising from the extended exposure of the hay to moisture and dampness.

The piling of hay in a cottage type stook eliminates a great deal of the spoilage simply because the bottom, or ground bales, lie on their edges rather than on their flat sides, and the sides of the stook slope downwardly from a substantially horizontal ridge. The orientation of the lowermost bales upon their edges permits a minimum of contact with the ground, and permits air circulation over the undersides of these bales with the result that the exposure of the hay to dampness is minimized. The sloping sides of the stook on the other hand are effective to shed rain water when it would otherwise soak into the bales.

Although the cottage type stook is the most desirable, it is also the most difficult to form and is usually produced by hand, although automatic or semi-automatic machines are known which produce small cottage type stooks of three bales. Larger stooks however are desirable in that the interior bales are protected from exposure to moisture and dampness and in that it is much simpler to pick up the bales after curing, since they are restricted to relatively few locations on the field. The automatic production of such large stooks of the cottage type however has hitherto been unknown.

The apparatus of the present invention is designed to fully automatically produce large cottage type stooks of from ten to fifteen bales ejected from a travelling baler. This apparatus is connected to the baler and comprises a stook supporting member, an elevated bale receiving station, a movable bale distributing carriage normally located below said bale receiving station, means for elevating bales from the discharged end of the travelling baler to said bale receiving station and orienting said bale with a longitudinal edge facing downwardly, means for releasing said bale from said bale receiving station onto said bale distributing carriage, means for directing said bale distributing carriage, upon receipt of a bale, downwardly to a predetermined bale depositing position above said stook supporting member, means for releasing said bale from the bale supporting carriage upon its arrival at said predetermined bale depositing position whereby said bale is deposited at a predetermined position in a stook being formed on said stook supporting member, means for returning said bales distributing carriage to its position beneath said bale receiving station upon release of said bale, and means for depositing a stook, when completed, upon the ground.

More specifically the stook supporting member is a fork composed of several tines with inverted V-shaped cross sections, adjacent tines being adapted to support a bale therebetween with a longitudinal edge facing downwardly. The means for elevating the bale comprises a guide-way which terminates in a twister adapted to rotate a bale approximately 45° about its longitudinal axes such that a longitudinal edge of the bale faces downwardly. The bale receiving station includes two downwardly converging flaps which support the bale in its rotated orientation. These flaps are adapted to pivot away from each other to permit the bale to drop into the distributing carriage which also includes downwardly converging flaps which support the bale in its rotated orientation in a manner similar to those of the bale receiving station. The carriage is provided with a wheel which is adapted to rotate between rails of a guiding trackway system which is composed of a generally vertical central trackway and a pair of lateral trackways directed downwardly from each side thereof. The wheel is guided in one or the other of these trackways by means of gates at the junction of the lateral trackways and the generally vertical trackway. The gates may be selectively opened or closed to direct the wheel, and hence the carriage, into one or other of these trackways. When the carriage reaches a predetermined bale depositing position the downwardly converging flaps are released to permit the bale to be deposited, either upon the fork or upon bales previously deposited to form the stook, whereupon the carriage is returned to its normal position below the bale receiving station. The carriage is further guided and maintained level in its downward and upward travel by means of articulated arms. When a stook is completed, the fork is released and drops under the weight of the bales to permit the lowermost rearward edges of the bales forming the bottom of the stook to touch the ground and, as the apparatus is drawn forward by the baler, the fork slides out from under the lowermost bales leaving the stook resting on the ground.

Figure 2:
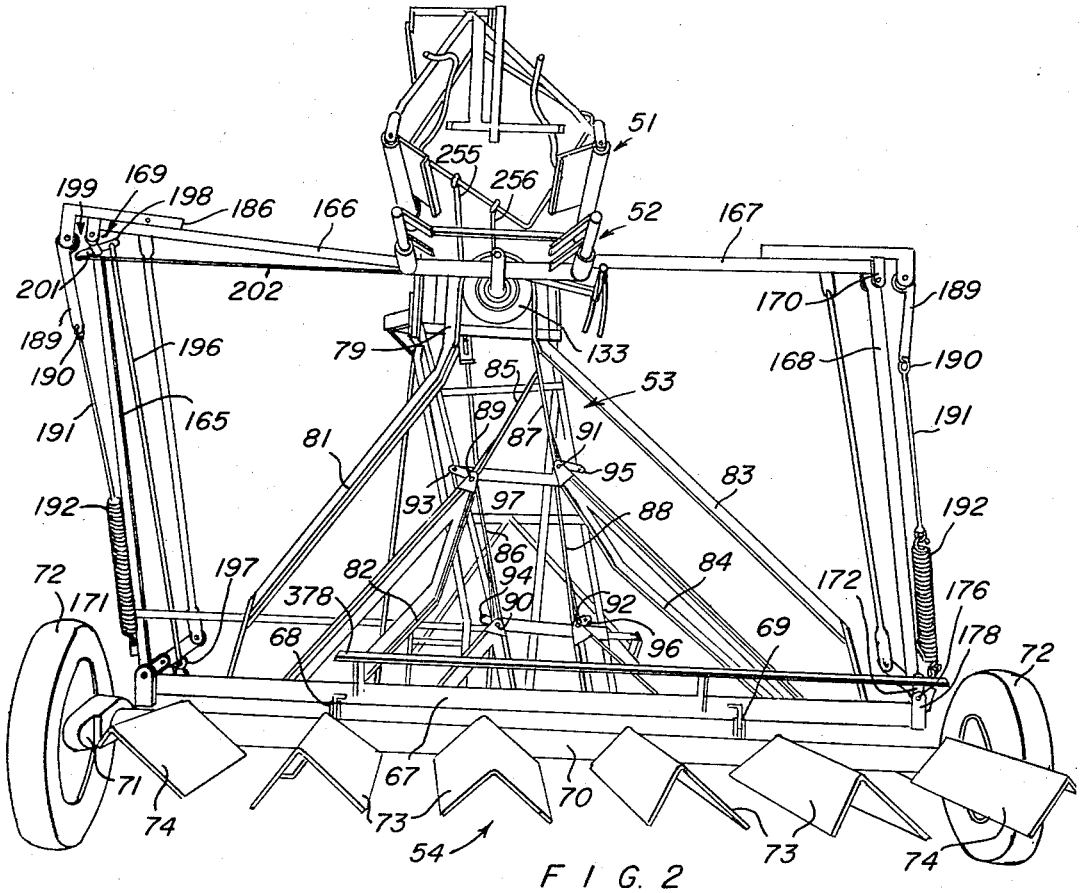
Figure 3:
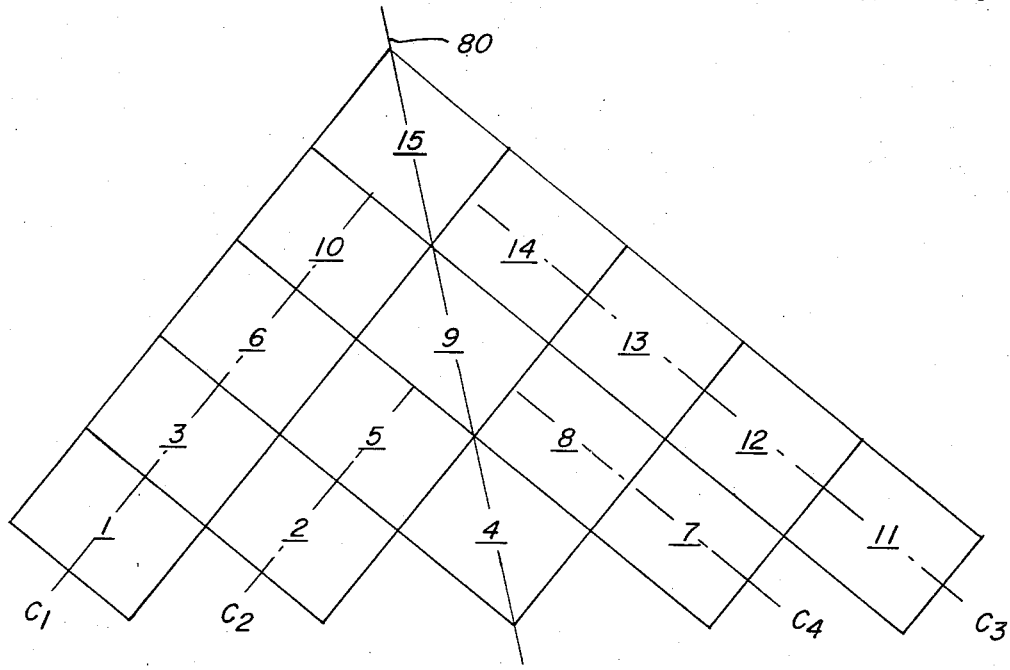
Figure 7:
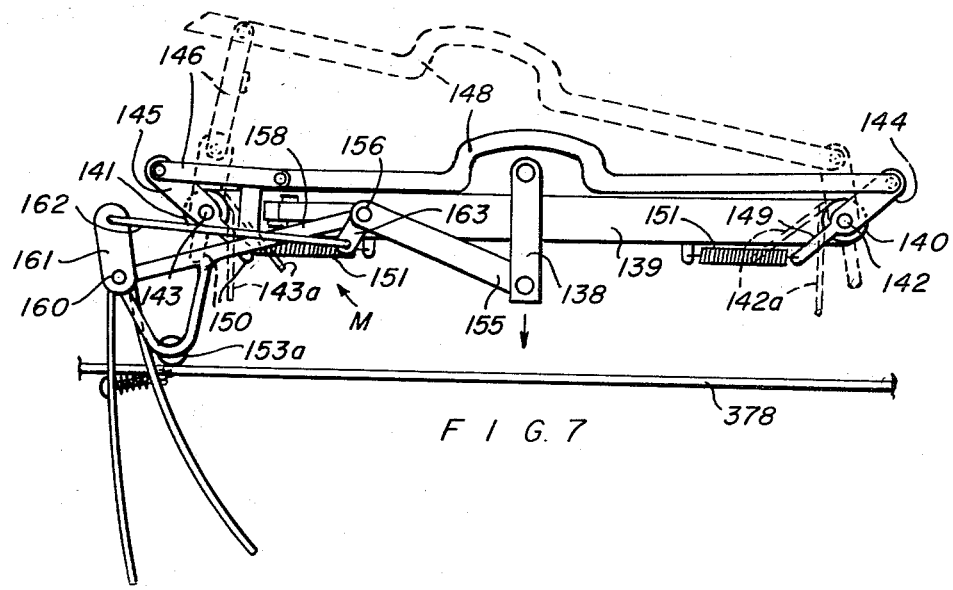
Figure 8:
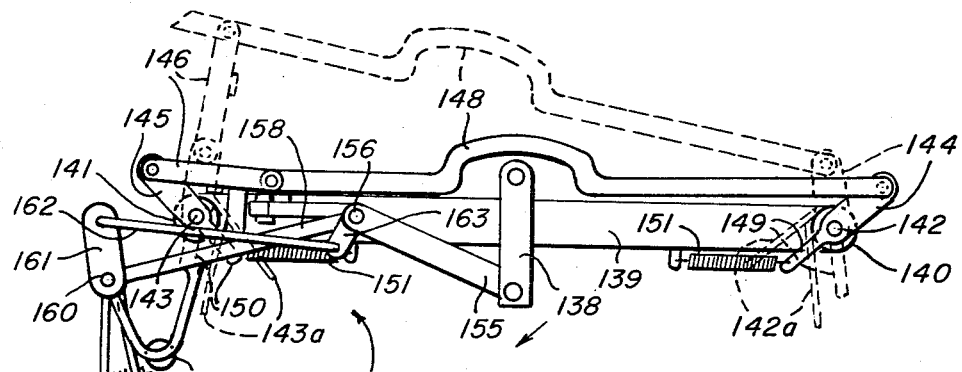
Figure 9:
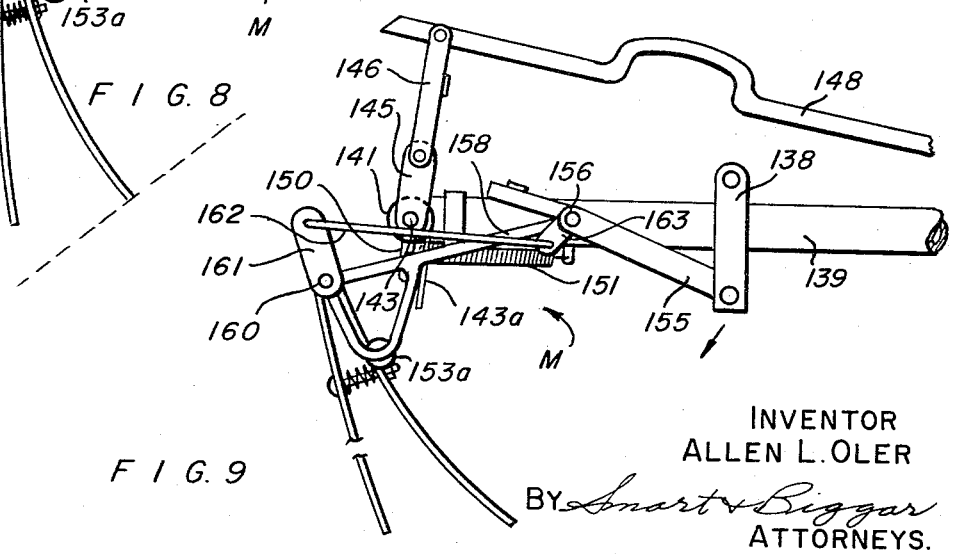

In drawings which illustrate embodiments of the invention:

FIGURE 1 is a perspective view of a stooking machine in accordance with the invention, as seen from the front or towing end, FIGURE 2 is a perspective view of the stooking machine of FIGURE 1, as seen from the fork or stook forming end, FIGURE 3 is a schematic view from the fork end of the stooking machine showing the configuration of the stooked bales and the order in which they are deposited to form the stook, FIGURE 4 is a perspective view of the bale receiving chamber and the bale delivery carriage positioned to receive a bale from the receiving chamber, FIGURE 5 is an end elevation of the bale receiving chamber as seen from the towing end of the stooking machine, FIGURE 5a appearing on the same sheet of drawings as FIGURE 23, is a detail of a means for dissipating the excessive force imparted to the bale by the baler, FIGURE 6 is a top plan view of the lever mechanism which releases the bale from the bale receiving chamber, FIGURES 7, 8 and 9 are front or towing end elevations of three operating mechanisms for releasing bales from the bale delivery carriage.

FIGURE 10 is a perspective detail of a portion of the bale delivery carriage operating mechanism shown in FIGURES 7, 8 and 9, FIGURE 11 is a perspective view of the cam operated mechanism which controls the order in which bales are deposited by the bale delivery carriage upon the fork of the stooking machine, FIGURE 11a appearing on the same sheet of drawings as FIGURE 22 is a sectional elevation of one of the valves controlling the downward and upward speed of the bale delivery carriage, FIGURES 12, 13, 14 and 15 are diagrammatic views of the cams, forming part of the mechanism shown in FIGURE 11, FIGURE 16 is a partial perspective view of an exemplary gate actuating mechanism, FIGURE 17 appearing on the same sheet of drawings as FIGURE 10, is a partial perspective view of the cam actuating mechanism, FIGURE 17a appearing on the same sheet of drawings as FIGURE 10, is a front view of the delivery carriage locking mechanism.

Figure 24:
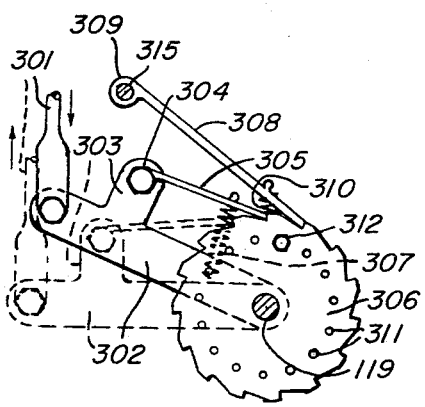
Figure 18:
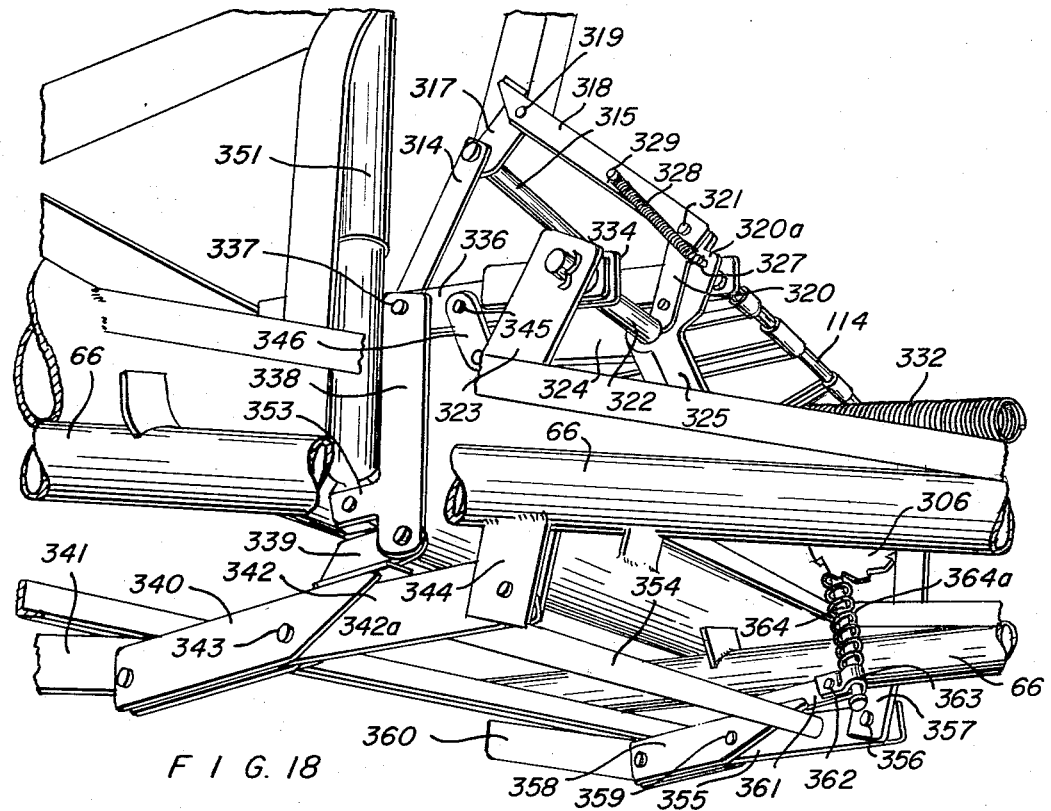
Figures 21, 21A:
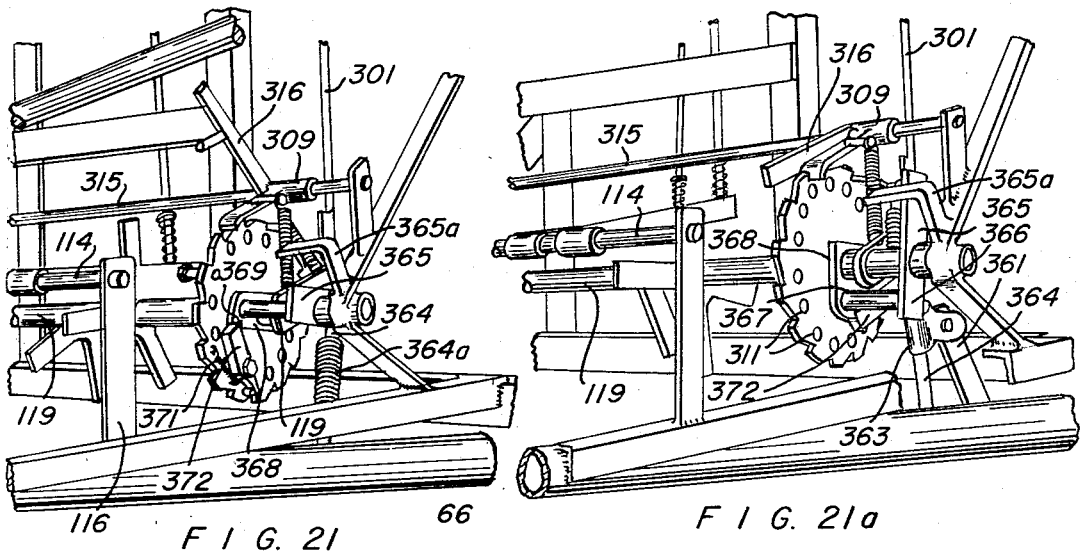

FIGURES 18, 19 and 20 are partial perspective views of the pre-trip and locking toggle linkage for the stooking machine fork, FIGURES 21 and 21a shown on the sheet of drawings containing FIGURE 18 are perspective views of the bale sequence control mechanism, FIGURE 22 is a perspective view of the pre-trip and locking toggle linkage for the fork, and the bale sequence control mechanism, FIGURE 23 is a schematic view showing the respective positions the articulated arms attached to the bale delivery carriage will assume in positioning the bales in their respective positions on the stooking machine fork, FIGURE 24 appearing on the same sheet of drawings as FIGURE 3, is a side elevation of the mechanism for operating the cams of FIGURES 12, 13, 14 and 15, FIGURE 25 shown on the same sheet of drawings as FIGURE 3 is a schematic view of the mechanism, associated with the bale delivery carriage for operating the mechanism of FIGURE 24.

Figures 27, 28:
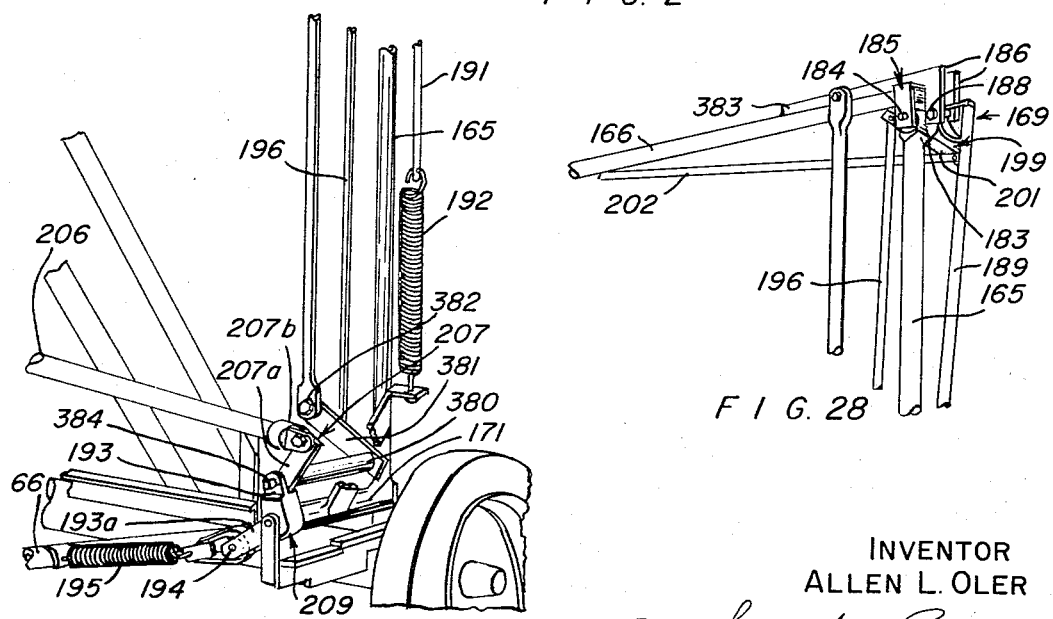

FIGURE 26 which appears on the same sheet of drawings as FIGURE 22, is a schematic view of the hinged connection of the bale delivery carriage guiding arms to a bracket which supports the bale delivery carriage and the carriage guide wheel, FIGURE 27 appearing on the same sheet of drawings as FIGURE 2, is a partial perspective of the lower portion of the bale delivery carriage guiding arms and their connection to the superstructure axle, FIGURE 28 appearing on the same sheet of drawings containing FIGURE 2, is a perspective view of the hinge connection between the vertical and horizontal bale delivery carriage guiding arms, FIGURE 29, appearing on the same sheet of drawings as FIGURE 23, is an enlarged perspective view of the lower bale receiving end of the inclined guideway which elevates the bales received from a baling machine into the bale receiving chamber, and, FIGURE 30 appearing on the same sheet of drawings as FIGURE 23, is a side elevation of the forward end of the stooking machine tow-bar.

To permit a clear understanding of the stooking machine and its operation, the various mechanical components will first be described in detail and then the manner in which the components coact and cooperate to effect the stooking operation will be described.

Referring to FIGURES 1 and 2 of the drawings, the stooker consists of an inclined bale elevating guideway 50, a bale receiving chamber 51, a bale delivery carriage 52, a carriage guiding trackway system 53, a bale supporting fork 54 upon which the bales are stacked to form a stook, and a bale sequence control mechanism 55 which is adapted to control the predetermined placement of the bales upon the fork and the ultimate disposition of the stooked bales upon the ground.

In greater detail and referring particularly to FIGURES 29 and 30, the stooker includes a tow-bar 56 which consists of two rearwardly converging arms 57 and 58 united to a transverse member 59. Adjacent to transverse member 59 there is secured, between arms 57 and 58, a spacer and stiffener member 60. The members 59 and 60 midway of their length are provided with bores through which passes a stub-shaft 61. The stub-shaft extends rearwardly and is secured to a sleeve 62 (see FIGURE 30) which is rotatably mounted upon a vertical shaft 63. The shaft 63 is secured at its top and bottom to straps 64 and 65 whose rearward extremities in turn are connected to tubular members 66.

Referring again to FIGURES 1 and 2, the tubular members 66 are rigidly fastened to a superstructure supporting axle 67 which is hingely secured at 68 and 69 (see FIGURE 2) to the main vehicle axle 70. The main axle has, at its extremities, arms 71 which are provided with spindles (not shown) upon which are rotatably mounted the vehicle supporting wheels 72. It will be appreciated from a study of the drawings that the longitudinal axis of the main axle 70 and the longitudinal axis of the wheel spindles are horizontally displaced one from the other, thereby providing an eccentric wheel mounting. Secured to and projecting rearwardly from the main axle 70 (see FIGURE 2) are a number of spaced inverted V-shaped tines 73. The tines 73 are rigidly secured to the axle 70 in any suitable manner, such as by the provision of lugs upon the tines 73 which are attached to the upper and lower extremities of axle 70. The tines 74 at the extremities of the axle are composed of flanged plates which may be secured to the axle in the same manner as tines 73. Adjacent tines define v-shape notches, the purpose of which will be more fully explained hereinafter.

Mounted upon the axle 67 is an upwardly extending superstructure 77 upon which is rigidly secured a bale delivery cariage guiding trackway system designated generally as 53. The lower extremities of the trackway system are secured to axle 67. The trackway system includes a centrally disposed trackway 79, the centre line of which is inclined upwardly at a small angle from the vertical to the left in FIGURE 2, the said centre line coinciding with the centre line 80 in FIGURE 3. Extending laterally and downwardly from the central trackway 79, are trackways 81 and 82 to the left and trackways 83 and 84 to the right thereof as seen in FIGURE 2. The angular disposition of the respective inclined trackways, left and right, being such that the centre lines of the trackways 81, 82, 83 and 84 coincide with the inclined centre lines $C_1$, $C_2$, $C_4$ and $C_3$ respectively of the bales shown in FIGURE 3. At the entrances to each of the laterally extending inclined trackways 81, 82, 83 and 84, where they intercept the substantially vertical trackway 79, there are provided gates 85, 86, 87 and 88 respectively, which are hingedly mounted upon the trackway system at 89, 90, 91 and 92 respectively. Hinge pins (not shown) are rigidly connected to the respective gates and project inwardly between the trackway and the superstructure, terminating in cranked portions 93, 94, 95 and 96 respectively. Pivotally connected to each of the cranked portions of the hinge pins are push rods 97, 98, 99 and 100 respectively (see FIGURE 11).

As seen in FIGURE 11 the aforementioned push rods pass through bores formed in lugs 104, 103, 102 and 101 respectively, formed on lever arms 108, 107, 106 and 105 respectively. On the push rods between the lugs 101, 102, 103 and 104 and flanges 109, there are mounted compression springs 113. Lever arms 105, 106, 107 and 108 are rotatably mounted on a shaft 114 which is supported in brackets 115 and 116 secured to the superstructure and the tow-bar respectively. Mounted intermediate the shaft 114 and the superstructure 77, in suitable bearing brackets 118 is a cam-shaft 119 which is rigidly secured to a series of grouped cam-fingers (see FIGURES 11, 12, 13, 14 and 15). The first group of cam fingers 129, 130, 131 and 132 (FIGURE 12) coacts with the lug 104 of lever arm 108 to raise push rod 97 and thereby actuate gate 85 which in turn controls access to trackway 81. The second group of cam fingers (FIGURE 13) secured to the cam-shaft comprises fingers 127 and 128 and coacts with lug 103 of lever arm 107 to raise push rod 98 to actuate gate 86 of trackway 82. The third group of cam fingers (FIGURE 14) comprises fingers 121 and 122 subtended by arcuate plate 123 and coacts with lug 102 of lever arm 106 to raise push rod 99 and thereby actuate gate 87. Similarly, the fourth group of cam fingers (FIGURE 15) comprising fingers 124 and 125 subtended by arcuate plate 126, actuates gate 88 through lug 101 and push rod 100. The arcuate plates 123 and 126 cause the push rods 99 and 100 to be raised for longer continuous periods of time than do the individual fingers of the first and second groups of cam fingers and as plate 126 subtends an angle twice the size of that subtended by plate 123 push rod 100 will be raised for twice the continuous period of time as push rod 99.

Referring now to FIGURE 16, which schematically illustrates the mechanism utilized to operate the respective gates described above, shaft 114 is shown with lever arm L mounted upon it, the lever arm L passing above cam-shaft 119. Secured to the cam-shaft are fingers F1 and F2, which, when cam-shaft 119 is rotated, contact lug L1 attached to lever arm L and raises the lever arm L into the dotted position L2, lifting push rod P, rotating crank C which through hinge-pin H rotates gate G. The return of the gate G to its trackway closing position when the fingers have moved out of contact with lug L1, is accomplished by a spring S attached to crank arm C. The purpose of spring S1 mounted between lug L1 and flange J is to cushion the moving parts and compensate for any irregularities caused by foreign matter lodging in the trackways, or other causes such as bending of the respective parts.

With reference to FIGURES 2, 4, 7, 8, 9, 10, 17, 17a and 26, the bale delivery carriage comprises a wheel 133 rotatably mounted on a spindle 134 which forms an integral part of bracket 135. Projecting upwardly from the bracket 135 is a series of lugs 136, 137 and 138. Mounted between the lugs 137 and 138 there is a transverse tubular member 139 whose central portion rests upon bracket 135 and is rigidly secured to said bracket and said lugs. Rigidly secured to the ends of the tubular member 139 are sleeves 140 and 141 which project forwardly slightly beyond the periphery of the tubular member (to the right as seen in greater detail in FIGURE 10). The opposite end of the sleeves project rearwardly a substantial distance beyond the tubular member to support journal bearings for shafts 142 and 143. The ends of the shafts 142 and 143, adjacent the transverse tubular member, project forwardly slightly and have secured thereon crank-arms 144 and 145 respectively. Hingedly secured to the crank-arm 145 is a link 146 (see FIGURES 7, 8, 9 and 10). The end of the link 146 remote from the crank-arm 145 is hingedly interconnected to crank-arm 144 by a link 148. The above described linkage results in a toggle-joint which operates in a well known manner. The shafts 142 and 143, at their opopsite ends project beyond the sleeves 140 and 141 a predetermined distance and have secured thereto bale supporting flaps 142a and 142b and 143a, 143b respectively, so arranged that they support a bale oriented with respect to the ground as shown schematically in FIGURE 3.

The crank arms 144 and 145 are provided with lugs 149 and 150 which are bored and are each adapted to receive one end of a tension spring 151. (See FIGURES 7, 8, 9 and 10.) The opposite ends of the springs are anchored to the transverse tubular member.

The toggle linkage above described and shown in full lines in FIGURES 7, 8, 9 and 10 is unlocked by a mechanism M which consists of substantially U-shaped bracket 154 rotatably mounted in a reclining position upon the transverse tubular member (as shown in FIGURE 10) by a bolt 156 which is supported at its outboard end by a bracket 155 which is secured at its opposite end to bracket 135. The bolt 156 extends through the outermost leg of bracket 154 and is threadedly engaged in the transverse tubular member 139. Rotatably mounted upon the bolt 156 between the legs of the U-shaped member 154 is a sleeve 157. Secured to the sleeve, and extending at a right angle to and outwardly therefrom to a position beyond and below sleeve 141, is a shaft 158. To the outward end of shaft 158 there is secured a second sleeve 159 parallel to sleeve 157. Secured to the underside of sleeve 159 and shaft 158 there is a V-shaped member 152 which has secured thereon a stub-shaft 153. Rotatably mounted upon stub-shaft 153 is a roller 153a. Journalled in sleeve 159 is a shaft 160 which projects a slight distance beyond the right hand end of its mounting sleeve, as shown in FIGURE 10, and has secured on this projecting portion a crank 161. The crank is provided with a bore which receives therein the cranked end of a rod 162, the opposite end of which is also cranked and is seated in a bore formed in lug 163 which projects downwardly and forwardly and is integral with the outermost leg of U-shaped bracket 154. The opposite end of shaft 160 projects a substantial distance beyond sleeve 159 and is restrained from lengthwise movement within its sleeve by a collar 160a secured thereon. A lever arm 164 is secured to the end of shaft 160 remote from the sleeve 159. Adjacent to arm 164 and spaced inwardly or to the right as shown in FIGURE 10, there is rotatably mounted on shaft 160 a second lever arm 164a yieldably attached to arm 164 by a bolt 164b and spring 164c. Intermediate the sleeves 157 and 159 there is secured to shaft 158 an arm 158a which projects upwardly and is offset to form an actuating arm 158b which rests, when in inoperative position, upon a bracket 158c secured to transverse tubular member 139. Arm 154b of U-shaped member 154 is restrained against downward movement by a stop 154c. The free end of arm 158b extends inwardly, towards transverse tubular member 139, to a position below links 146. The function of the linkage will be more fully disclosed when the operation of the bale stooker is described hereafter.

The bale delivery carriage previously described is mounted and constrained to travel in the trackway 53 by articulated arms 165, 166 and 167, 168, (see FIGURES 1, 2, 23, 26, 27 and 28). The arms 165, 166 are interconnected by an elbow joint 169 whilst the arms 167, 168 are interconnected by elbow joint 170. The arms 165 and 168 at their lowermost extremities are rigidly connected to transverse sleeves 171 and 172. The sleeve 171 is rotatably mounted upon a shaft 173 which is supported in bores formed in lugs 174 and 175 projecting upwardly from each side of one end of axle 67, and the sleeve 172 of arm 168 is rotatably mounted on a shaft 176 supported in bores formed in lugs 177 and 178 projecting upwardly from each side of the other end of axle 67. The substantially horizontal arm 166 at the end remote from the elbow joint 169 is secured to a plate 179 (see FIGURE 26) which has secured thereto spaced aligned collars 180–181. The collars are provided with bores adapted to receive bearings (not shown) rotatably mounted upon a shaft 182 which is supported in lugs 136, 137 and 138 of bracket 135.

The construction of the elbow joints 169 and 170 are more clearly shown in FIGURE 28. As the joints are identical, only one need be described in detail. The joint comprises a sleeve 183 rigidly secured to arm 165 in a direction transverse to its longitudinal axis. The sleeve has formed therein a bore which is provided with bearings (not shown) mounted for rotation on a pin 184. The pin 184 is mounted and retained in bores formed in the arms of a yoke 185 which is rigidly secured to the substantially horizontal arm 166. The yoke 185 is provided with spaced lugs 186 which project outwardly beyond the elbow joint to form lever arms which are bent downwardly at right angles and are provided with bores adapted to receive a bolt 188 upon which is suspended, intermediate said lugs 186, an eyed rod 189, the lower end of which is pierced and has threaded therethrough a link 190 which is secured to the top of a rod 191. The lower end of the rod 191 has an eye formed therein, in which one end of a tension spring 192 is anchored (see FIGURES 1 and 2). The opposite end of the tension spring 192 is anchored to an eye formed on the lower extremity of arm 165.

Referring now to FIGURE 27, secured to sleeve 171 on the end remote from attached arm 165 is a crank arm 193, which has a downwardly directed arm 193a. The lower extremity of arm 193a below the sleeve 171 is bifurcated and provided with bores through which pass a pin or bolt 194. Attached by looped ends to each of the bolts are springs 195 which are anchored at their opposite ends to tubular members 66 of the stooking machine frame.

An identical arrangement is provided in association with sleeve 172.

In order to maintain the delivery carriage level transversely throughout its travel when delivering bales onto the fork or when receiving them from the receiving chamber there is provided in conjunction with the arms 165 and 166 (see FIGURES 1, 2 and 28) a linkage which comprises a rod 196 pivotally anchored at its lower end to an eye 197 formed on lug 175 (see FIGURE 1). The upper end of the rod is pivotally secured to one arm 198 on an inverted T-shaped member 199. The stem 200 of the member 199 is provided with a bore through which passes pin 184 of elbow joint 169. The opposite arm 201 of the T-shaped member is pierced with a bore and has pivoted thereon one end of a rod 202 which extends substantially horizontal (see FIGURES 1 and 2) and is pivotally connected at the end remote from the T-shaped member 199, to a bracket 203 on the carriage 52 (see FIGURE 17). It will be noted that the inverted T-shaped member is normally so oriented that the head of the T, 198–201 (FIGURE 2) assumes an angle of approximately 45° to the vertical and horizontal axis of the machine.

The arms 165 and 168 are also interconnected by a hydraulic control system 55 which absorbs the shock of the bales dropping onto the bale delivery carriage and also functions to control the speed of the bale delivery carriage both in its downward and upward travel (see FIGURES 1, 11 and 11a). The system consists of a cylinder 205 provided with a piston (not shown) and piston rod 206. The rod 206 extends towards the right as seen in FIGURE 1, and as seen in FIGURE 27, the end is provided with a clevis 207 which is attached to a link 207a by pin 207b. The link 207a is secured to a sleeve 380 which has secured on its opposite end a lever arm 381. Attached to the free end of the lever arm 381 by a bolt 382 is the end of an eyed rod 381a which extends upwardly and is hingedly attached by a bolt to rib 383 secured on arm 166 (see FIGURE 28). The sleeve 380 is rotatably mounted on a pin 384, seated at one end in a bore formed in the free end of arm 193 of cranked lever 209, and at its opposite end in a bore formed in arm 165. Attached by a pin 210 to an eye 211 formed on the opposite end of the cylinder is a yoke 212. Rigidly secured to the closed end of the yoke is a rod 213 which extends laterally and terminates in a clevis 214. The clevis 214 is pivotally attached by a pin 215 to arm 216 of a double cranked lever 217 rigidly connected to sleeve 172. There is also provided at this end a rod 381a mounted in a manner similar to that previously described. The hydraulic system is supported midway of its length by a rod 218 which is hingedly connected at its upper end to the stooking machine superstructure whilst its lower end is hingedly connected to yoke 212 by pin 210. A reservoir-surge tank 221 and the tubing circuits that interconnect the system 204 are supported and secured to the top of cylinder 205. The opposite ends of the cylinder are interconnected by a conduit circuit which includes a conduit 222 which is connected through an adjustable valve 220 to a port at the right hand end of the cylinder as seen in FIGURE 1. The opposite end of the conduit 222 is attached to a three-way or T connection 223. The arm of the three-way connection opposite to the connection of conduit 222 thereto is connected to a conduit 224 which connects through an adjustable valve 225, with a port on the left hand end of cylinder 205 as seen in FIGURE 11. The valves 220 and 225 are identical and are constructed to permit regulation of the speed of descent of the carriage and also the speed of ascent when it is unloaded. Referring to FIGURE 11a the valve 220 comprises a body portion 226 provided with connections 226a and 226b adapted to be threadedly connected to the cylinder port at one end and to the conduit 222 respectively. The downwardly directed boss 226c is bored and internally threaded to receive a valve stem 226d. The upwardly directed boss 226e has formed therein a bore 227, the bottom of which communicates with the threaded bore housing the valve stem. The valve stem protrudes upwardly into the bore 227. A ball 228 of lesser diameter than the bore 227 rests upon the free end of the valve stem. The ball when in the position shown in FIGURE 11a restricts the flow of fluid from the cylinder to the opposite end thereof or to the reservoir 221. When the piston in the cylinder travels away from the port connected to the valve the ball will be lifted upwardly until it impinges against a pin 227a which restrains the ball from entrainment in the fluid and being carried out of the valve body. When the ball is thus unseated the fluid flow is relatively unrestricted. It will be appreciated that the valve stem may be adjusted to regulate the passage of fluid from the cylinder. The valve 220 controlling the ascent of the carriage remains at a fixed position but the valve 225 controlling the descent of the carriage will be adjusted to compensate for the different weight of bales that may be produced arbitrarily by the baler operator.

Referring now to FIGURES 1 and 29, the tow-bar 56 at its forward end between the arms 57 and 58 has secured thereon a cross bar 229 provided at its central point with a bore adapted to receive a vertically disposed pin 230. Rotatably mounted upon the pin is a U-shaped frame member 231, the upstanding arms of which are provided with clevises 232 in which flexible side-rails 233 and 234 are slidably received. The flexible side rails converge from the U-shaped member upwardly for a sort distance and thence are spaced parallel to one another and terminate in slidable engagement with clevises 235 secured to a rectangular frame 236. A similar pair of rails 237 and 238 disposed in edgewise relation form the bottom of the inclined bale elevating guideway 50. The bottom rails at their lower ends are slidably mounted in eyed lugs 239 secured to the base of U-shaped member 231 and at their upper ends are slidably mounted in eyed bars 240 secured at their lower ends to frame 236 and at their upper ends to the cross-head of superstructure 77. In order to smoothly guide the bales ejected from the baler into the bale elevating guideway there is provided a transverse member 241 bridging members 57 and 58 and arcuate straps 242 which are secured thereto at their lower ends and which overlie plate 245, secured to rails 237 and 238, at their upper ends. The straps 242 are supported midway their length by struts 243 which project upwardly from transverse member 244. The four rails 233–234–237–238 are supported in spaced relation to one another midway of their length by a U-shaped frame member 246, which in turn is supported on braces 247 inclined downwardly and rearwardly to connect with the braces 248 extending between the axle 67 and the tubular members 66 of the tow-bar. The rectangular frame 236 is supported at its lower corners by straps 250 which extend from substantially vertical extensions 249 secured to the crosshead of superstructure 77. The result of this construction of the bale elevating giudeway, and in particular the sliding engagement of rails 233–234 and 237–238 at their upper and lower ends, is to permit the guideway to flex with the draw bar when the apparatus is turned and to permit the flexible adjustment of the bale elevating guideway as the apparatus is drawn over rough and uneven terrain.

With reference to FIGURE 1, the upper portion of rectangular frame 236 has pairs of twisted top rods 251 and side rods 252 secured thereto. The rods are further secured to rectangular frame 253 which is angularly disposed with respect to frame 236. The rod 251 to the left terminates at this frame while the other rod 251 is bent downwardly and is attached to the central portion of the left hand arm of an inverted V-shaped frame member 254. The right hand side rod 252 which is attached to approximately the central position of the right hand side of box-like frame 253 slopes downwardly and, adjacent its end, is attached to the mid-point of the right hand arm of the inverted V-shaped frame member 254. The left hand side rod 252 is attached to the rectangular frame 253 and extends rearwardly where it is secured to the inverted V-shaped member 254. The bottom of the bale guideway between the cross-head of the superstructure 77 and rectangular frame 253 is formed by rods 255 and 256. The rod 255 extends from the cross-head to the lowermost corner of the rectangular frame 253 and rod 256 extends from the rectangular frame 236 to the rectangular frame 253. The purpose of the twisted rods 251 and 252 the bars 240 and the bottom rods 255 and 256 is to receive a bale which has its transverse axis substantially horizontal, and turn it until the axis is tilted to the same extent as rectangular frame 253. This orients the bales with respect to the horizontal as shown schematically in FIGURE 3.

Referring now to FIGURE 1, and more particularly to FIGURES 4, 5 and 6, attached to, and extending rearwardly from the superstructure extensions 249 are parallel bars 257. These bars are connected to, and maintained in spaced relation at their free or rearward ends by inverted V-shaped member 254, and also by struts 258 which connect the bars 257 to the rectangular frame 253, the rods 251 and 252 serving to rigidify and reinforce the structure. Secured to the bars 257 and projecting downwarly therefrom (see FIGURE 4) are pairs of lugs 259 and 260, the former being adjacent the extensions 249 and the latter being at the free ends of bars 257. Shafts 261 provided with trunnions on each end, are rotatably mounted in bores formed in each of the pairs of lugs 259 and 260. The forwardly directed trunnion project beyond the lugs 259 and have secured to their projecting portions lever arms 267 and 268. The lever arm 268 has rotatably secured thereon by a rivet or the like a link 269 which extends toward and is rotatably secured, by a rivet or the like, to a link 270. The opposite end of the link 270 is rotatably secured to lever arm 267 to complete a togglelinkage which is utilized to release bales from the bale receiving chamber as will be more fully described. This toggle linkage is maintained in the position shown in FIGURE 4 by means of counter-balance W which extends outwardly from shaft 261 on arm 292 and springs 287 which are secured at one end to lugs 287a formed on shafts 261 and at the other end to lugs (not shown) secured to frame 253.

Secured to each of the shafts 261 are elongated flaps 271 which converge downwardly. The inverted V-shaped member 254 has secured thereon a plate 272 which has secured to its rearward end, a transverse tubular shaft 274. Mounted for rotation within tubular shaft 274 is a shaft 275 to which is rigidly secured, a lever arm 276 which extends downwardly approximately midway between the bars 261. The opposite end of shaft 275 projects beyond shaft 274 and has rigidly secured thereon one end of a lever-arm 277. Pivotally mounted on the other end of the lever-arm 277 is a link 278 which is pivotally secured to arm 279a of bell-crank 279. The bell-crank is pivotally mounted upon a stub-shaft 280 which is secured to a standard 281 mounted upon the foremost end of shaft 257 as seen in FIGURE 4. The arm 279b of the bell crank is rotatably attached at its end to a link 283 which extends downwardly through an eyed guide member 284 secured to bar 257. The link 283 has formed at its lower end a rearwardly extending cranked portion 285 which is adapted to underlie links 269 and 270 intermediate the shaft 261 and the pivotal connection between links 269 and 270.

The bale actuated tripping mechanism for releasing the toggle locking member of the bale receiving chamber hereinbefore described is provided with a shock absorbing and bale arresting means which comprises a T-shaped lever arm 286 pivotally mounted at its stem upon stubshaft 280. The upper arm 286a of the lever bears against arm 279a of the bell crank. The lower arm 286b is pierced by a bore which has passed therethrough one end of a spring 289. The opposite end of the spring is anchored in a lug 282 formed on shaft 257. The function of the spring is two-fold in that it returns the tripping linkage and the mechanism on the bale receiving chamber to bale retaining position after a bale has been released. In this respect it is assisted by springs 287 connected at one end to a lug 287a on the shaft 261 and anchored at the other end to the superstructure. The spring 289 and lever 286 and 279 respectively also dissipate the excess energy of a bale which is ejected from the baler with a force greater than normal and which is transmitted to the bale entering the bale receiving chamber.

When the stooker is travelling over the fields, shocks caused by the roughness of the field are transmitted to the apparatus which at times are sufficiently severe to cause the bale delivery carriage to travel prematurely downwardly thereby presenting a hazard to the operator and the mechanism. There is therefore provided in conjunction with the bale releasing mechanism on the receiving chamber, a carriage locking means operable by the receiving chamber bale release toggle joint. The locking means consists of a lever arm 400 pivoted intermediate its ends on shaft 401 (see FIGURES 17 and 17a) secured adjacent the top end of central trackway 70. Integrally connected to lever arm 400 is a weighted arm 400a which extends into the path of collar 180 for a purpose to be hereafter described. The trackway 79, to the right of FIGURES 17 and 17a, on the wheel guiding surface is pierced at 402 to permit passage therethrough of bulbous portion 403 secured upon the lower end of lever-arm 400. The bulbous portion 403, when in operative position protrudes to snub the wheel 133. The upper end of the lever-arm 400 is pivotally secured to a lever 404. The lever 404 adjacent its free end is restrained to a reciprocating path by a guide member 405 which also permits lateral movement to a limited degree.

The lever arm 404 is notched on its free end at 406 and has seated therein a pawl 407. The pawl 407 forms one arm of a bell crank 408 which is rockably mounted by sleeve 409 upon a stub shaft 410 secured to a bracket 411 protruding angularly from the top of trackway 79. The arm 412 of bell-crank 408 extends angularly upward and is bent at a right angle at its upper free end to provide a claw 413 which is positioned above and overlies link 270 of the receiving chamber toggle linkage.

Reference will now be made to FIGURES 1, 11, 17, 18, 19, 20, 21, 24 and 25 wherein a mechanism for controlling the sequence in which the bales are deposited on the fork 54 and the ultimate delivery of stooked bales to the ground is illustrated. The mechanism comprises a cranked lever-arm 293 (FIGURE 17) which is pivotally supported on a shaft 294 mounted in a bearing bracket 295 attached to the superstructure 77 adjacent its crosshead. The arm 296 of cranked lever-arm 293 has rigidly secured thereon a stub-shaft 297 which projects into the path travelled by a cam 298 secured to bracket 135 of bale delivery carriage 52. Secured to the bearing sleeve 299 of cranked lever arm 293 is a crank-arm (FIGURES 17 and 25) and pivotally secured thereto is a rod 301 which extends downwardly and is pivotally connected to a lever-arm 302 (FIGURES 24 and 25) which is provided with a bore at its opposite end through which extends shaft 119 such that lever-arm 302 is rotatable about the shaft 119. The lever-arm 302 is provided with an upstanding boss 303, to which is secured a bolt 304. Rotatably mounted on the bolt is a ratchet pawl 305 which engages the teeth of a ratchet wheel 306 rigidly attached to shaft 119. The pawl 305 is maintained in contact with the ratchet wheel by a tension spring 307 attached at one end to the lever-arm 302 and at its opposite end to the pawl 305. To prevent regression of the ratchet wheel a second pawl 308 is mounted, above pawl 305, on shaft 315 through sleeve 309. The free end of the pawl 305 is urged into engagement with the ratchet wheel by a spring 310 which is attached at one end to the pawl and at its opposite end to lever-arm 302. Adjacent the periphery of the ratchet wheel there is provided a series of spaced bores 311 into which may be fitted a bolt 312 or the like.

Shaft 315 is mounted in brackets 313 and 314 above shaft 119 and between it and the guiding trackway (FIGURES 11, 18, 20 and 21). To the end of shaft 315 adjacent the ratchet wheel there is rigidly secured a lever-arm 316. The lever-arm 316 extends forwardly and has formed thereon a protuberance 316a which extends into the path of the bolt 312 projecting from ratchet wheel 306. The opposite end of shaft 315, adjacent mounting bracket 314, has secured thereto a lever-arm 317 which is pivotally attached to a double armed link 318 by a pivot pin 319. The opposite end of link 318 is pivotally secured to a lever arm 320 by pivot pin 321. Lever-arm 320 adjacent its opposite end is pivotally mounted on a bell crank 320a that is rigidly secured to a shaft 322 journalled at its ends in brackets 323 and 324. The lower end 325 of lever 320a projects below shaft 322 and is provided with a stud 331 to which one end of a tension spring 332 is attached, the opposite end of the spring is secured to bracket 333 mounted on the tow-bar. Lever 320a is provided with a stud 327 to which one end of a tension spring 328 is attached, the opposite end of the spring being attached to a stud 329 secured to the link 318 whereby link 318 and lever 320a are biased toward each other. Secured to the opposite end of shaft 322 are spaced levers 334 which embrace, and are pivotally connected to a link 336 through pivot pin 335. At its opposite extremity the link 336 is pivotally secured through pivot pin 337, to a link 338 which extends downwardly and is rotatably attached to an eye 339 formed on bifurcated link 340. The link 340 at one end is hingedly attached to a lever arm 341 rigidly secured to the fork axle 70. The other end of link 340, adjacent eye 339 is rotatably secured to a link 342 through pin 343. The link 342 at its opposite end is rotatably attached by a pin 342a to bifurcated lug 344 secured to the underside of bar 66. Rotatably mounted intermediate the ends of link 336, by pivot pin 345, is a pair of links 346. The link 346 is also pivotally attached to one end of a T-shaped teeter-lever 326. The stem 348 of the teeter-lever is rotatably mounted upon shaft 322 between spaced levers 334. The free end of the head of the teeter-lever 349 coacts with an abutment 350 formed on the tow-bar to limit the travel of the above linkage of which it forms a part.

To cushion the shock during the unloading and return of the stook forming mechanism to operative position a shock absorber 351 is attached at its top end to the superstructure at 352 and at its lower end to an eye 353 formed on link 338 (FIGURE 20).

Rigidly secured to link 342 is a transverse rod 354 which is secured at its opposite end to link 355 (FIGURES 18 and 19). The link 355 at one end is rotatably mounted on pin 356 which is supported by bifurcated lug 357 secured to the underside of tubular member 66. The opposite end of link 355 is positioned between a pair of spaced links 358 and is hingedly connected to the same through pin 359. The links 358 at their opposite ends are pivotally connected to lever-arm 360 rigidly secured on the fork axle 70. Thus there is provided interconnected linkage between the fork 54 and the superstructure 77 which functions to control and distribute the stresses and forces set up during the unloading and return of the apparatus during stook forming operations.

Straddling dual links 358 and rigidly attached thereto is an eye 361. Pivotally secured to the eye, by a pin 362 there is a collar 363. Slidably mounted within the collar there is a shaft 364 which extends upwardly and is pivotally attached to one end of a lever-arm 365 (FIGURES 21 and 21a). Freely encircling shaft 364, between the lever-arm is a compression spring 364a. The lower end seating on the collar and the upper end bearing against the lever-arm. Intermediate its ends the lever-arm 365 is rotatably mounted upon shaft 119. The opposite arm 366, adjacent its free end, has secured thereon and at right angles thereto a shaft 367 (FIGURES 11, 21 and 21a). At its other end shaft 367 is rigidly joined to a lever-arm 368 which is journalled at its opposite end upon shaft 119. The end of the lever-arm 368, adjacent shaft 367, is notched at 369 for a purpose which will be apparent hereafter. Rotatably secured to the ratchet wheel 306, by a bolt or the like, there is a pawl 372 which, upon rotation of the lever-arms 366–368 will impinge against and nest in notch 369. Continued rotation of the lever-arms imparts rotation to the ratchet wheel and shaft 119 attached thereto. The pawl 372 is urged into operative position by a spring 371 which is attached at one end to the pawl and at its opposite end anchored to the ratchet wheel. The bale sequencing and stook unloading mechanism is designed to build a stook of bales varying in number from ten to fifteen. This is accomplished by inserting and securing the bolt or pin 312 in the appropriate bore 311 formed in the ratchet wheel.

Having thus described the mechanical aspects of the apparatus, its operation will now be described in detail. The stooking machine is connected to a baling machine by arms 57 and 58 of tow-bar 56 (FIGURE 29) which aligns the delivery chute of the baling machine with the mouth of the inclined bale elevating guideway 50 (FIGURE 1). The forward end of the tow-bar is pivotally mounted on pin 63 (FIGURE 30) to permit the baling machine and stooking machine to be turned in a very short radius. To permit the baling machine and stooker to pass over uneven ground the front portion of the tow-bar is also pivoted on shaft 61 (FIGURE 29) whereby the arms 57 and 58 are permitted to move in vertical arcs about the longitudinal axis of shaft 61. The rails 233–234 and 237–238, (FIGURE 1) are flexible and are mounted in the clevises 232 and eyed lugs 239 whereby they are permitted to slide freely without binding or otherwise preventing relatively free movement of the forward end of the tow-bar. The U-shaped member 231 swivels on pin 230 and the shaft 61 permits the forward portion of the tow bar to rock in a vertical plane thus providing a universal union between the baler and stooking machine. The side rails 233 and 234 diverge in a downward direction a sufficient amount so that when turning the baling and stooking machines the bale delivery chute of the baler will not be obstructed by the mouth of the inclined bale elevating guideway 50. The bales as they are ejected from the baler contact upwardly inclined bars 242, and travel upwardly onto plate 245 and thence onto bottom rails 237, 238 between side rails 233 and 234. The bales are ejected intermittently from the baler and as each bale leaves the bale delivery chute of the baler to enter the mouth of the bale elevating guideway of the stooking machine it contacts the immediately preceding bale and pushes it forward the equivalent of one bale length. Thus a continuous chain of bales extends from the bale delivery chute of the baler up the bale elevating guideway. When the topmost bale enters box-like frame 236 (FIGURE 1), it rides over bars 240 and rods 255 and 256 and as the rod 256 is progressively elevated above rod 255 the bale is canted to the left when it enters bale receiving chamber 51. The framework of the bale receiving chamber is also disposed at an angle to receive the tilted bale and it further cants the bale until it assumes a position to coincide with the schematic end elevation of the bales shown in FIGURE 3. As the bale travels towards the rear of the bale receiving chamber it slides on flaps 271 until it reaches the rear of the bale receiving chamber where it contacts lever-arm 276 (FIGURES 4, 5 and 6) and presses it rearwardly. Simultaneously with the impingement of a bale against lever 276 it also contacts and is impaled upon tines 373. The tines are united by a cross-shaft 374 which is rotatably mounted in a sleeve 375. The sleeve 375 is secured to the free end of a leaf-spring suspension member 376 which at its opposite end is attached to a bracket 377 secured to the apex of inverted V-shaped frame 254. The tines are retained in bale receiving position by a crank-arm 385 which is secured to cross-shaft 374. The free end of the crank-arm is attached to a tension spring 386 which has its opposite end anchored on tubular shaft 274. The tines are retained in proper position to impale the bale by a stop 387 which coacts with a lever-arm 388 formed on cross-shaft 374.

Rearward movement of the lever-arm 276 rotates shaft 275 causing crank-arm 277 to rotate counterclockwise, thereby pulling rearwardly upon link 278, rocking bell-crank 279, lifting link 283, which causes the cranked portion 285, formed thereon, to contact and raise link 269 and its associated link 270, thereby unlocking the toggle linkage as indicated in phantom in FIGURE 5. Flaps 271 are then free to rotate downwardly under the weight of the bale and the bale drops therebetween onto the bale delivery carriage 52. When the bale has dropped onto the carriage the tension springs 287 and weight w, associated with the above described linkage, return flaps 271 to normal bale receiving position.

When the bale is released from the receiving chamber it drops downwardly towards the carriage. The jolts and vibrations transmitted to the apparatus as it travels over rough or uneven terrain may cause the dropping bales to be rotated to such an extent that their descent is not arrested by the carriage. With this in mind the tines 373 are utilized to resist rotation of the bale until it is deposited in the carriage and are released when the carriage descends.

Simultaneously with unlocking and upward movement of link 270 of the toggle linkage on the receiving chamber, link 270 contacts claw 413 of arm 412 (FIGURES 17 and 17a) causing it to rock on its pivot thereby moving arm 407 out of contact with the notch 406 releasing lever 404. Upon the release of the lever, the carriage containing the bale starts downwardly as does the weighted arm 400a, which causes lever arm 400 to pivot about shaft 401 thus withdrawing bulbous portion 403 from the hole 402. As lever arm 400 pivots about shaft 401, the lever 404 is urged to the left, the pawl 407 having been withdrawn. When the carriage has carried the bale beyond the end of lever 276 the toggle linkage associated with the receiving chamber, due to the pull of the springs associated therewith, starts to return the linkage to the locked position freeing lever 412 which permits pawl 407 to rotate downwardly and rest on lever 404. As the carriage returns upwardly the collar 180 contacts weighted arm 400a pushing it up and causing lever arm 400 to pivot about shaft 401 to reinsert the bulbous portion 403 into hole 402. Simultaneously the lever 404 is pulled fully to the right and pawl 407 drops into notch 406 to lock the wheel 133 and the apparatus is again in bale receiving position.

The bale released from the bale receiving chamber is received by the bale delivery carriage 52 upon fingers 142a, 142b, 143a and 143b attached to the respective shafts 142 and 143. The weight of the bale upon the carriage is sufficient to overcome the pull of springs 192 and 195 attached to the arms 165, 166 and 167, 168 (FIGURE 1) and the carriage descends in guide trackway 53, hereafter referred to as the trackway. Assuming that this is the first bale of a stook to be built upon the fork, the gate 85 of lateral trackway 81 is open, as shown in FIGURE 2, thereby forming a ramp which directs the wheel 133 of the carriage into lateral trackway 81. The carriage continues to roll down lateral trackway 81 until roller 153a (FIGURE 10) contacts leaf spring 378 attached to axle 67 (FIGURES 2 and 7). Continued travel of the carriage forces mechanism M upwardly. Arm 158a–158b impinges against and raises link 146 upwardly also raising link 148 to unlock the toggle linkage of which they form a part. The weight of the bale upon fingers 142a, 142b, 143a and 143b rotates shafts 142, 143 until the linkage and fingers assume the position shown in phantom in FIGURE 7. The bale then drops into the first notch of the fork 54 to the left in FIGURE 2. FIGURE 23 shows diagrammatically the position assumed by the arms 165, 166 and 167, 168 when the carriage has descended to deposit the bales in each of the five notches, which receive the five bales forming the base of the stook illustrated diagrammatically in FIGURE 3.

The carriage, as it descends, is controlled by shock-absorber system 204 (FIGURES 1 and 11) which has been regulated by means of valve 225 to maintain the descent of the carriage at a uniform rate and thereby reduce the impact of the carriage upon the system. The upward travel of the carriage under the action of tension springs 192 and 195 is also controlled by shock-absorbing system 204 by regulating valve 220 so that no undue shock is transmitted to the trackway. The operation of this shock absorber system is as follows: as the carriage descends the inner ends of the upper arms 166 and 167 are urged downwardly and, through rods 381a, force the piston (not shown) and cylinder 205 towards each other thereby forcing the oil from between the piston and cylinder head, at the left hand end in FIGURES 1 and 11, through the adjustable valve 225 and into the opposite end of the cylinder through the conduits 224 and 222, the adjustable valve 225 in this instance being throttled. When the bale upon the carriage has been released the springs 192 and 195 exert a pull upon the arms which carry the carriage upwardly. The upward travel of the carriage by means of arms 166 and 167 carry rods 381a upwardly causing the piston and cylinder connected thereto to travel in opposite directions, that is, away from each other, displacing the fluid stored in the right hand end of the cylinder out from between the cylinder and piston through adjustable valve 220 and conduits 222 and 224 into the opposite left hand end of the cylinder. Any excess fluid will be forced up into the reservoir-surge tank 221. The travelling in the upward direction moves at a slightly greater speed than in the downward direction of travel.

The carriage, when it reaches approximately the upper limit of its travel, is utilized to initiate rotation of the ratchet wheel 306 and its attached cam shaft 119 (FIGURES 11, 17, 21, 21a, 22, 24 and 25). Adjacent the wheel mounting spindle 134 on bracket 135, is affixed a projection 298 which strikes stub-shaft 297 (FIGURE 17) forcing lever 296–293 upwardly thereby causing sleeve 299 to rotate, and crank-arm 300 and rod 301 pivotally connected thereto to move upwardly. The upward movement of rod 301 raises lever 302 (FIGURE 24) causing pawl 305, pivotally mounted thereon, to rotate ratchet wheel 306 and the attached cam-shaft 119. The cam finger indicated as 132 in FIGURE 12 strikes and raises lug 104 of lever-arm 108 (FIGURE 11) pushing rod 97 upwardly to rotate crank portion 93 (FIGURE 2) secured to the hinge pin or gate 85, thereby rotating gate 85 to its open position with its upper free end bearing against gate 87 to permit access of the carriage wheel 133 into trackway 81.

When the carriage has deposited the first bale of the stook in the notch of the fork to the left in FIGURE 2 as described, and has returned to its position immediately below bale receiving chamber 51, actuating ratchet wheel 306 in the process to open gate 86, gate 85 having been closed through the action of spring S (FIGURE 16) upon the release of lug 104 by finger 132, the carriage receives bale number 2. The carriage then descends and, by virtue of the open gate 86, is directed into trackway 82. The carriage is then tripped by impingement of roller 153a on leaf spring 378 and bale number 2 drops into the second notch of the fork from the left in FIGURE 2. The carriage then returns to the top and actuates the ratchet wheel 306 as before, again opening gate 85. Bale number 3 is then received and the carriage travels down trackway 81. This time, however, the mechanism on the carriage for releasing the bale is tripped by lever 164a (FIGURE 8), which impinges on the bale number 2, which is pushed upwardly as the carriage continues to descend. Upward travel of the lever 164a raises shaft 158 (FIGURE 10) which pivots about bolt 156 bringing arm 158a–158b into contact with link 146 and raises link 148 to break the locking action of the toggle linkage, thereby permitting shafts 142 and 143 to rotate under the weight of the bale and release the bale which drops into the V formed by bales number 1 and number 2 (FIGURE 3). The carriage then returns to the upper limit of its travel to receive bale number 4, this time opening no gate, and bale number 4 is deposited in notch number 3 of fork 54 from the left in FIGURE 2.

The above description of the operation of the stooking machine to deposit the first four bales upon the fork outlines the manner in which the control mechanism 55, in conjunction with the carriage, functions to operate the gates to open the trackways, and also the manner in which the bales are released from the carriage by the operation of the mechanism M against the toggle linkage mounted upon the carriage to unlock said toggle linkage. The bales 1, 2, 4, 7 and 11 are oriented by mechanism 55 and released by operation of the mechanism M against the toggle linkage as described above with reference to bales number 1, 2 and 4. Bales 3, 5, 6, 9, 10 and 15 are also oriented by the mechanism 55 and the release of the toggle mechanism on the bale delivery carriage is in the manner described with reference to bale number 3. The remaining bales 8, 12, 13 and 14 are directed to their positions in a similar manner, by the mechanism 55, but the release of these bales from the carriage is effected in a slightly different manner as illustrated in FIGURE 9. In this instance when it strikes an adjacent bale, the lever 164 is pushed inwardly towards the carriage, rotating shaft 160 (FIGURE 10) and crank-arm 161 secured thereon which pulls rod 162 and thus lug 163 imparting rotation to U-shaped frame 154. The arm 154b contacts links 146 and 148 at their junction forcing these upwardly to unlock the toggle linkage.

The sequence in which the gates 85, 86, 87 and 88 are opened and closed to build a stook of fifteen bales as illustrated diagrammatically in FIGURE 3 is as follows: initially control mechanism 55 (FIGURES 11, 12, 13, 14 and 15) is in a position to deposit bale number 1 in the first notch on the fork (FIGURE 3). That is cam finger 132 is in contact with lug 104 of lever arm 108 and has raised it to open gate 85 and permit access to trackway 81. It will be appreciated that the carriage will ascend and descend as previously described, for each gate opening and that it need not be recited here for each operation. Gate 85 closes and cam finger 127 raises lever 107 opening gate 86 to trackway 82 to position bale number 2. Gate 86 closes and cam finger 131 raises lever 108 opening gate 85 to trackway 81 to deposit bale number 3 between bales number 1 and number 2. Gate 85 closes and all gates remain closed as bale number 4 is deposited down substantially vertical trackway 79. Cam finger 128 raises lever 107 to open gate 86 to trackway 82 and bale number 5 is placed upon bale numbers 2 and 4. Gate 86 closes and cam finger 130 raises lever 108 to open gate 85 to trackway 81 and bale number 6 is deposited between bales number 3 and number 5. Gate 85 closes and cam fingers 122–121 bridged by plate 123 raises lever 106 to open gate 87 and trackway 83 to permit the depositing of bales number 7 and number 8 successively upon the fork. Bale number 7 seating in the fourth notch of the fork from the left hand side in FIGURE 2, whilst bale number 8 is placed between bales number 4 and number 7. Gate 88 closes and all gates remain closed and substantially vertical trackway 79 is open and bale number 9 is deposited between bales number 5 and 8. Cam-finger 129 raises lever 108 opening trackway 81 and bale number 10 comes to rest between bales number 6 and number 9. Gate 85 closes and cam fingers 124 and 125 bridged by plate 126 contacts and raises lever-arm 105 opening gate 88 and trackway 84. Gate 88 remains open while bales number 11, number 12, number 13 and number 14 are deposited. Bale number 11 resting in the fifth notch on the fork. The remaining bales 12, 13 and 14 are superimposed one upon the other in numerical order as shown in FIGURE 3. Gate 88 closes and the other gates remain closed so that the carriage descends in upright trackway 79 to deposit bale number 15 between bales number 10 and number 14.

Figure 25:
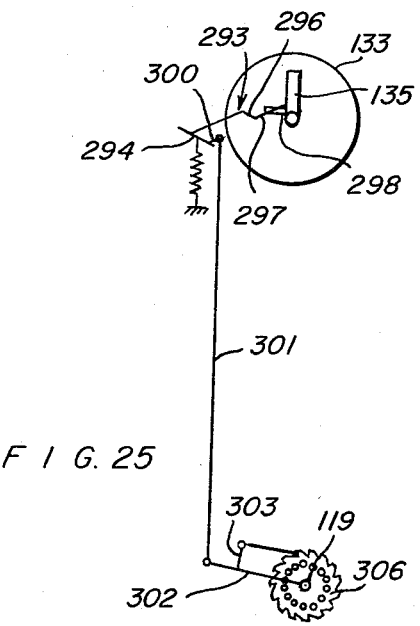

Upon the last bale number 15 being deposited upon the stook and the carriage returning to the top of the trackway the stub-shaft 297 is contacted by projection 298 (FIGURE 17), secured on bracket 135 of the carriage, actuating lever 293–296, crank-arm 300, rod 301, lever-arm 302 and pawl 305 which rotates ratchet-wheel 306 (FIGURES 24 and 25). Since the stook contains 15 bales, the bolt or pin 312 (FIGURE 24) will be placed in the bore immediately between the first and fifteenth notch on the ratchet wheel. When the ratchet-wheel rotates the bolt 312 contacts and forces up pre-trip lever-arm 316 (FIGURES 21, 21a, 22) which imparts rotation to shaft 315. Upon rotation of shaft 315, lever-arm 317 (FIGURES 18 and 20) secured thereto also rotates forcing links 318, hingedly mounted thereon, to move upwardly unlocking the pre-trip toggle linkage. When the toggle linkage is unlocked lever 320 is free to rotate and tension spring 332 attached to the lower end 325 of lever 320a exerts a pull upon it, rotating shaft 322 counterclockwise. Upon rotation of shaft 322 links 334 secured thereon rotate in a counterclockwise direction forcing links 346 downwardly, rotating T-shaped lever 326 counterclockwise until end 349 thereof impinges against and is stopped by the stop block 350. Continued rotation of shaft 322 causes link 336 to be fulcrumed upon T-shaped lever 326 by links 334, pulling upon link 338 and eye 339 attached to links 340. This action unlocks toggle linkage 340–342 (FIGURE 20) which, owing to the weight of the stooked bales upon the fork, forces the fork downwardly until the rear bottom corners of the five bales, forming the base, contact the ground and continued travel of the machine forwardly slides the fork from under the stook.

Simultaneously with the release and downward travel of the fork tines 73 and 74, attached to axle 70, the axle rotates arms 71 attached thereto, and the wheel spindle within the wheel hub utilizes the wheel as a fulcrum to force the superstructure supporting axle 67 upwardly by means of interconnecting hinges 68 and 69. Upward movement of the axle 67 raises superstructure 77 upwardly also. When the stook is free of the fork the weight of the superstructure upon the interconnecting hinges 68 and 69 rotate axle 70 in the opposite direction causing the arms 71 to fulcrum upon the wheels to raise the fork tines clear of the ground and substantially parallel thereto in position to receive another stook.

With the unloading of toggle linkage 340–342, a corresponding toggle-linkage 355–358 (FIGURES 22 and 18) on the opposite side of the stooking machine, which is interconnected to toggle-linkage 340–342 by rod 354, is unlocked and snaps open. The opening of the toggle-linkage 355–358, through eye 361 attached to the top of links 358, forces collar 363 upwardly against spring 364a which transmits the thrust to lever arm 365 rotating it and interconnected arm 368 (see FIGURES 21 and 21a) until lever arm 365 abuts stop 365a. If the stook being built upon the fork consists of less than fifteen bales the notch 369 impinges against pawl 372 and imparts rotation to ratchet wheel 306 and shaft 119 secured thereon. The location of pawl 372 relative to notch 369 will depend upon the number of bales in the stook, in each case however, rotation will continue until lever arm 365 strikes stop 365a, at which point pin 312 will be returned to its initial starting position. Any further travel of eye 363 will simply result in compression of spring 364a. If the stook being built consists of fifteen bales pin 312 will move to its initial starting position after striking pre-trip lever-arm 316 so that repositioning is independent of any movement of notch 369 on lever-arm 368.

As the fork drops under the weight of the stook upon release of the toggle linkage, pin 343 will be swung closer to pin 342a and, through links 340, 339, 338 and 336 levers 334 will be swung counterclockwise as seen in FIGURE 20. Shaft 322 and lever 320a will also be rotated counterclockwise against the force of spring 332 to draw links 318 down, rotating lever 318 and shaft 315 to gain lock the pre-trip toggle linkage. When the fork is drawn from under the stook the superstructure, which has been elevated, drops back to return the fork to its initial bale receiving position and again lock toggle linkages 340–342 and 355–358. Thus, with rotation of shaft 315, the free end of lever 316 is brought back into the path enscribed by the bolt 312. The superstructure 77 and the fork 54 are now locked in stook forming position and the carriage control mechanism is oriented to commence the formation of another stook.

While in the foregoing there has been shown and described a specific embodiment of the invention, various modifications will readily occur to those skilled in the art to which the invention pertains. Accordingly it is not desired to limit the invention to this disclosure, and accordingly all suitable modifications and equivalents may be resorted to, falling within the scope of the invention as claimed.

The embodiments of the invention in which an exclusive property or privilege is claimed are defined as follows:

1. Apparatus for automatically stooking bales ejected from a travelling baler comprising, a stook supporting fork, an elevated bale receiving station, a movable bale distributing carriage normally located adjacent said bale receiving station, means for elevating bales discharged from said travelling baler to said bale receiving station and for orienting said bales with a longitudinal edge facing downwardly, means for transferring said bales from said bale receiving station onto said bale distributing carriage, means for directing said bale distributing carriage, upon receipt of a bale, downwardly to a predetermined bale depositing position above said stook supporting fork, means for releasing a bale from said bale distributing carriage upon its arrival at said predetermined bale depositing position, whereby the bale is deposited at a predetermined position in a stook being formed on said stook supporting fork, means for returning said bale distributing carriage to its position adjacent said bale receiving station upon release of the bale, and means for depositing a stook, when completed, upon the ground, wherein said bale distributing carriage comprises a frame, two parallel shafts rotatably mounted on said frame and extending substantially horizontally therefrom beneath said bale receiving station, downwardly converging bale supporting members depending from said shafts, a toggle linkage restraining said shafts against rotation and maintaining said bale supporting members in converging relationship, and a carriage guide wheel rotatably mounted on said frame, and wherein said means for directing said bale distributing carriage to a predetermined bale depositing position comprises a first pair of substantially vertically disposed rails further pairs of downwardly sloping rails extending laterally from each side of, and in communication with, said first pair of rails, and selectively operable gate means controlling access from said first pair of rails to each of said further pairs of rails, all of said rails lying in a substantially vertical plane and each pair of said rails terminating adjacent said stook supporting fork and being adapted to constrain said carriage guide wheel for movement therebetween.

2. Apparatus as defined in claim 1 wherein said bale receiving station comprises at least two downwardly converging bale supporting members hingedly mounted at their upper edges upon substantially horizontally disposed shafts for rotation thereabout, and a toggle linkage maintaining said surfaces in converging bale supporting relationship.

3. Apparatus as defined in claim 2 wherein said bale receiving station is provided with a linkage, actuable by a bale entering said receiving station, to release said toggle linkage to permit rotation of said bale supporting members.

4. Apparatus as defined in claim 1 including an externally actuable, bale distributing carriage toggle linkage releasing lever, rotatably mounted upon said bale distributing carriage frame.

5. Apparatus for automatically stooking bales ejected from a travelling baler comprising a main vehicle axle, each end of said axle supporting a stub axle parallel thereto and offset therefrom, a pair of rotatable ground engaging wheels mounted on said stub axles, a substantially horizontally disposed draw bar connected through a toggle joint to one side of said main axle, a substantially horizontally disposed stook supporting member rigidly connected to the other side of said main axle, a second axle parallel to and above said main axle and hingedly supported thereon, a superstructure connected to and projecting upwardly from said second axle, a bale receiving station at the upper extremity of said superstructure, a movable bale distributing carriage normally located in bale receiving position below said bale receiving station, a carriage guiding wheel rotatably mounted on said carriage, first guide means for directing and elevating bales discharged from the baler to said bale receiving station, a trip mechanism actuable by a bale upon entry into said bale receiving station whereby to release a bale from said station onto said bale distributing carriage, a trackway system engageable with said carriage guiding wheel for directing said bale distributing carriage downwardly, upon receipt of a bale, to a predetermined bale depositing position above said stook supporting member, means for releasing said bale from the bale distributing carriage upon reaching said predetermined bale-depositing position, resilient means for returning said bale distributing carriage to bale receiving position below said bale receiving station upon release of a bale, and trip means actuable by said bale distributing carriage upon its return to said bale receiving position, for depositing a completed stook upon the ground, wherein said trackway system comprises a substantially vertically disposed pair of parallel rails two further pairs of parallel rails communicating with said pair of substantially vertically disposed rails and extending laterally downwardly from each side thereof, said rails lying in a common plane and terminating adjacent said stook supporting member, with each pair of rails being spaced apart a distance to permit movement of said carriage guiding wheel therebetween, a gate at the junction of each lateral pair of rails and said substantially vertically disposed pair to control access from said substantially vertically disposed pair to said lateral pairs, and means selectively operating said gates.

6. Apparatus as defined in claim 5 wherein said means selectively operating said gates comprises, a gate operating member connected to each gate, a cam shaft, cams mounted on said cam shaft, each cam adapted to actuate one of said gate operating members, and means for intermittently advancing said cam shaft whereby to cause one of said cams to actuate one of said gate operating members.

7. Apparatus as defined in claim 6 wherein said means for intermittently advancing said cam shaft comprises a ratchet wheel rigidly connected to said cam shaft and a ratchet wheel operating pawl actuated by said bale distributing carriage upon its return to bale receiving position.

References Cited
UNITED STATES PATENTS

| | | | |
|---|---|---|---|
| 2,740,250 | 4/1956 | Olson et al. | 214—6 |
| 2,909,264 | 10/1959 | Kneib | 198—7 |
| 3,080,071 | 3/1963 | Pratt et al. | 214—6 |
| 3,158,270 | 11/1964 | Prentice | 214—6 |
| 3,223,253 | 12/1965 | Garbe et al. | 214—6 |
| 3,232,412 | 2/1966 | Bloss | 198—33.3 |

GERALD M. FORLENZA, *Primary Examiner.*

J. E. OLDS, R. J. SPAR, *Assistant Examiners.*